(12) United States Patent
Newmeyer et al.

(10) Patent No.: US 11,639,468 B2
(45) Date of Patent: May 2, 2023

(54) BLUE-EMITTING NANOCRYSTALS WITH CUBIC SHAPE AND FLUORIDE PASSIVATION

(71) Applicant: Nanosys, Inc., Milpitas, CA (US)

(72) Inventors: Benjamin Newmeyer, San Jose, CA (US); Christian Ippen, Cupertino, CA (US); Ruiqing Ma, Morristown, NJ (US); Diego Barrera, San Jose, CA (US); Jesse Robert Manders, Mountain View, CA (US)

(73) Assignee: Nanosys, Inc., Milpitas, CA (US)

( * ) Notice: Subject to any disclaimer, the term of this patent is extended or adjusted under 35 U.S.C. 154(b) by 0 days.

(21) Appl. No.: 17/712,505

(22) Filed: Apr. 4, 2022

(65) Prior Publication Data

US 2022/0228060 A1    Jul. 21, 2022

Related U.S. Application Data

(62) Division of application No. 16/925,799, filed on Jul. 10, 2020, now Pat. No. 11,312,905.

(60) Provisional application No. 62/941,228, filed on Nov. 27, 2019, provisional application No. 62/872,866, filed on Jul. 11, 2019.

(51) Int. Cl.
*C09K 11/88* (2006.01)
*C09K 11/02* (2006.01)
*C09K 11/08* (2006.01)
*C09K 11/61* (2006.01)
*B82Y 40/00* (2011.01)

(52) U.S. Cl.
CPC ............ *C09K 11/883* (2013.01); *B82Y 40/00* (2013.01); *C09K 11/02* (2013.01); *C09K 11/025* (2013.01); *C09K 11/0883* (2013.01); *C09K 11/612* (2013.01)

(58) Field of Classification Search
CPC ..... B82Y 40/00; C09K 11/883; C09K 11/025; C09K 11/0883; C09K 11/612
See application file for complete search history.

(56) References Cited

U.S. PATENT DOCUMENTS

2021/0020858 A1\* 1/2021 Qin .................. C09K 11/54

\* cited by examiner

*Primary Examiner* — C Melissa Koslow
(74) *Attorney, Agent, or Firm* — EIP US LLP

(57) ABSTRACT

This disclosure pertains to the field of nanotechnology. The disclosure provides methods of preparing nanostructures with fluoride passivation. The disclosure also provides methods of preparing nanostructures with fluoride and amine passivation. The nanostructures have high quantum yield, narrow emission peak width, tunable emission wavelength, and colloidal stability. Also provided are nanostructures prepared using the methods. And, nanostructure films and molded articles comprising the nanostructures are also provided.

17 Claims, 12 Drawing Sheets

BLUE-EMITTING NANOCRYSTALS WITH CUBIC SHAPE AND FLUORIDE PASSIVATION

FIELD OF THE INVENTION

Field of the Invention

This disclosure pertains to the field of nanotechnology. The disclosure provides methods of preparing nanostructures with fluoride passivation. The disclosure also provides methods of preparing nanostructures with fluoride and amine passivation. The nanostructures have high quantum yield, narrow emission peak width, tunable emission wavelength, and colloidal stability. Also provided are nanostructures prepared using the methods. And, nanostructure films and molded articles comprising the nanostructures are also provided.

Background Art

Semiconductor nanostructures can be incorporated into a variety of electronic and optical devices. The electrical and optical properties of such nanostructures vary, e.g., depending on their composition, shape, and size. For example, size-tunable properties of semiconductor nanoparticles are of great interest for applications such as light emitting diodes (LEDs) and liquid crystal displays (LCDs). Highly luminescent nanostructures are particularly desirable for such applications.

Steric bulk of long-chain alkyl ligands can result in insufficient ligand coverage on the surface of semiconductor nanocrystals due to packing limitation. Similarly, rounded particle surfaces exhibit steps, pits, and kinks that can be difficult to passivate with ligands. Such unpassivated sites on the surface of quantum dots can lead to mid-gap states that act as hole traps when an electric potential is applied across the quantum dots. Holes will accumulate at the HTL-QD interface leading to a rise in operating voltage and irreversible electrochemical degradation.

The native ligand set (e.g., carboxylates and phosphines) of most quantum dots is hydrophobic and thus quantum dots comprising these native ligands are not soluble in a wide range of organic media and are incompatible with matrix materials commonly used in the preparation of quantum dots films. Ligand exchange can be used to solve these problems but the exchange may influence surface trap states and hence, the photoluminescence quantum yield of the quantum dots. For example, metal carboxylate complexes were readily displaced from carboxylate-terminated ME complexes (ME=CdSe, CdS, PbSe, or PbS) using various Lewis bases (Anderson, N. C., et al., *J. Am. Chem. Soc.* 135:18536-18548 (2013)). However, it was found that removal of up to 90% of surface-bound $Cd(O_2CR)_2$ (R=oleyl or tetradecyl) from CdSe and CdS nanocrystals resulted in a decrease in the photoluminescence quantum yield from 10% to <1% for CdSe nanocrystals and from 20% to <1 for CdS nanocrystals. Hence, it was found that photoluminescence quantum yield and ligation were not simply related, not only because of their nonlinear independence, but also because $Cd(O_2CR)_2$ can concurrently be displaced with amine binding.

A need exists to produce nanostructures that have high quantum yield, narrow emission peak width, tunable emission wavelength, and colloidal stability.

BRIEF SUMMARY OF THE INVENTION

In some embodiments, the present disclosure provides a nanostructure comprising a core comprising a nanocrystal core; and at least one shell disposed on the core, wherein at least one shell comprises ZnS and fluoride.

In some embodiments, the core comprises ZnSe, ZnSeTe, InP, or InAs. In some embodiments, the core comprises $ZnSe_{1-x}Te_x$, wherein $0 \leq x < 1$.

In some embodiments, the nanostructure comprises two shells. In some embodiments, at least one shell comprises ZnSe. In some embodiments, at least one shell comprises ZnSe and fluoride. In some embodiments, the at least one shell comprises a first shell comprising ZnSe and a second shell comprising ZnS and fluoride. In some embodiments, the at least one shell comprises a first shell comprising ZnSe and fluoride, and a second shell comprising ZnS and fluoride.

In some embodiments, the fluoride is in the form of a metal fluoride, ammonium fluoride or tetraalkylammonium fluoride. In some embodiments, the fluoride is in the form of a metal fluoride comprising $ZnF_2$, $HfF_4$, or $ZrF_4$. In some embodiments, the metal fluoride is $ZnF_2$.

In some embodiments, at least one shell comprises ZnS and $ZnF_2$. In some embodiments, at least one shell comprises ZnSe and $ZnF_2$.

In some embodiments, the fluoride is in the form of a tetraalkylammonium fluoride comprising tetrabutylammonium fluoride, tetrapropylammonium fluoride, diisopropyldimethylammonium fluoride, tetraethylammonium fluoride, and tetramethylammonium fluoride, dioctadecyldimethylammonium fluoride, dihexadecyldimethylammonium fluoride, ditetradecyldimethylammonium fluoride, didodecyldimethylammonium fluoride, didecyldimethylammonium fluoride, dioctyldimethylammonium fluoride, bis(ethylhexyl)dimethylammonium fluoride, octadecyltrimethylammonium fluoride, oleyltrimethylammonium fluoride, hexadecyltrimethylammonium fluoride, tetradecyltrimethylammonium fluoride, dodecyltrimethylammonium fluoride, decyltrimethylammonium fluoride, octyltrimethylammonium fluoride, phenylethyltrimethylammonium fluoride, benzyltrimethylammonium fluoride, phenyltrimethylammonium fluoride, benzylhexadecyldimethylammonium fluoride, benzyltetradecyldimethylammonium fluoride, benzyldodecyldimethylammonium fluoride, benzyldecyldimethylammonium fluoride, benzyloctyldimethylammonium fluoride, benzyltributylammonium fluoride, or benzyltriethylammonium fluoride. In some embodiments, the tetraalkylammonium fluoride is tetrabutylammonium fluoride.

In some embodiments, the molar ratio of fluoride bound to the nanostructure to zinc in the nanostructure is between about 0.05 and about 0.33.

In some embodiments, the molar ratio of fluoride bound to the nanostructure to zinc in the nanostructure is about 0.13. In some embodiments, the molar ratio of fluoride bound to the nanostructure to zinc in the nanostructure is about 0.32.

In some embodiments, the nanostructure further comprises a solvent. In some embodiments, the solvent is a non-polar solvent. In some embodiments, the non-polar solvent comprises hexane, heptane, octane, toluene, or mixtures thereof. In some embodiments, the non-polar solvent is octane. In some embodiments, the non-polar solvent is hexane.

In some embodiments, the nanostructure exhibits a photoluminescence quantum yield of between about 60% and about 99%. In some embodiments, the nanostructure exhibits a photoluminescence quantum yield of between about 70% and about 99%.

In some embodiments, the nanostructure comprises a core comprising ZnSe, and at least one shell comprising ZnS and $ZnF_2$. In some embodiments, the nanostructure comprises a core comprising ZnSe, at least one shell comprising ZnSe, and at least one shell comprising ZnS and $ZnF_2$. In some embodiments, the nanostructure comprises a core comprising ZnSe, at least one shell comprising ZnSe and $ZnF_2$, and at least one shell comprising ZnS and $ZnF_2$. In some embodiments, the nanostructure comprises a core comprising $ZnSe_{1-x}Te_x$, wherein 0≤x<1, and at least one shell comprising ZnS and $ZnF_2$. In some embodiments, the nanostructure comprises a core comprising $ZnSe_{1-x}Te_x$, wherein 0≤x<1, at least one shell comprising ZnSe, and at least one shell comprising ZnS and $ZnF_2$. In some embodiments, the nanostructure comprises a core comprising $ZnSe_{1-x}Te_x$, wherein 0≤x<1, at least one shell comprising ZnSe and $ZnF_2$, and at least one shell comprising ZnS and $ZnF_2$.

In some embodiments, the nanostructure is a quantum dot. In some embodiments, the nanostructure is substantially cubic in shape.

In some embodiments, the present disclosure provides a method of preparing a nanostructure, comprising:
(a) providing a nanocrystal core;
(b) optionally admixing the core in (a) with a zinc source and a selenium source to provide a core with a ZnSe shell;
(c) admixing the core in (a) or the core with a ZnSe shell in (b) with a fluoride source; and
(d) infusing a solution comprising a zinc source and a sulfur source into the admixture in (c);
to provide the nanostructure.

In some embodiments, the core comprises ZnSe, ZnSeTe, InP, or InAs. In some embodiments, the core comprises $ZnSe_{1-x}Te_x$, wherein 0≤x<1. In some embodiments, the core comprises ZnSe.

In some embodiments, the admixing in (b) is at a temperature between about 250° C. and about 350° C. In some embodiments, the admixing in (b) is at a temperature of about 310° C.

In some embodiments, the admixing in (b) comprises admixing the core in (a) with a zinc source, a selenium source, and optionally a fluoride source to provide a core with a shell comprising ZnSe and fluoride. In some embodiments, the fluoride source comprises a metal fluoride, $NH_4F$, or a tetraalkylammonium fluoride. In some embodiments, the fluoride source is a metal fluoride comprising $ZnF_2$, $HfF_4$, or $ZrF_4$. In some embodiments, the fluoride source in is $ZnF_2$.

In some embodiments, the admixing in (c) is at a temperature between about 70° C. and about 130° C. In some embodiments, the admixing in (c) is at a temperature of about 100° C.

In some embodiments, the infusing in (d) is at a temperature between about 250° C. and about 350° C. In some embodiments, the infusing in (d) is at a temperature between is at a temperature of about 310° C.

In some embodiments, the infusing in (d) is at an infusing rate between about 0.05 mL/min and about 2.0 mL/min. In some embodiments, the infusing in (d) is at an infusing rate of about 0.1 mL/min.

In some embodiments, the selenium source in (b) comprises trioctylphosphine selenide, tri(n-butyl)phosphine selenide, tri(sec-butyl)phosphine selenide, tri(tert-butyl) phosphine selenide, trimethylphosphine selenide, triphenylphosphine selenide, diphenylphosphine selenide, phenylphosphine selenide, cyclohexylphosphine selenide, octaselenol, dodecaselenol, selenophenol, elemental selenium, hydrogen selenide, bis(trimethylsilyl) selenide, or mixtures thereof. In some embodiments, the selenium source in (b) is trioctylphosphine selenide.

In some embodiments, the zinc source in (b) comprises diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source in (b) is zinc oleate.

In some embodiments, the fluoride source in (c) comprises a metal fluoride, $NH_4F$, or a tetraalkylammonium fluoride. In some embodiments, the fluoride source in (c) is a metal fluoride comprising $ZnF_2$, $HfF_4$, or $ZrF_4$. In some embodiments, the fluoride source in (c) is $ZnF_2$.

In some embodiments, the zinc source in (d) comprises diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source in (d) is zinc oleate.

In some embodiments, the sulfur source in (d) comprises trioctylphosphine sulfide, elemental sulfur, octanethiol, dodecanethiol, octadecanethiol, tributylphosphine sulfide, cyclohexyl isothiocyanate, α-toluenethiol, ethylene trithiocarbonate, allyl mercaptan, bis(trimethylsilyl) sulfide, trioctylphosphine sulfide, or combinations thereof. In some embodiments, the sulfur source in (d) is trioctylphosphine sulfide.

In some embodiments, the present disclosure provides a nanostructure comprising a core comprising ZnSe or $ZnSe_{1-x}Te_x$, wherein 0≤x<1, and a first metal fluoride; and at least one shell disposed on the core, wherein at least one shell comprises ZnS and optionally a second metal fluoride.

In some embodiments, the core comprises ZnSe. In some embodiments, the core comprises $ZnSe_{1-x}Te_x$, wherein 0≤x<1.

In some embodiments, the nanostructure comprises two shells.

In some embodiments, the first metal fluoride comprises $ZnF_2$, $HfF_4$, or $ZrF_4$. In some embodiments, the first metal fluoride is $ZrF_4$.

In some embodiments, the second metal fluoride comprises $ZnF_2$, $HfF_4$, or $ZrF_4$. In some embodiments, the second metal fluoride is $ZrF_4$.

In some embodiments, at least one shell comprises ZnS and $ZrF_4$.

In some embodiments, the molar ratio of fluoride in the nanostructure to zinc in the nanostructure is between about 0.05 and about 0.35.

In some embodiments, the nanostructure further comprises a solvent. In some embodiments, the solvent is a non-polar solvent. In some embodiments, the non-polar solvent comprises hexane, heptane, octane, toluene, or mixtures thereof. In some embodiments, the non-polar solvent is octane. In some embodiments, the non-polar solvent is hexane.

In some embodiments, the nanostructure exhibits a photoluminescence quantum yield of between about 60% and about 99%. In some embodiments, the nanostructure exhibits a photoluminescence quantum yield of between about 70% and about 99%.

In some embodiments, the nanostructure comprises a core comprising ZnSe and a metal fluoride comprising $ZnF_2$, HfF$_4$, or ZrF$_4$; and at least one shell comprising ZnS and a metal fluoride comprising ZnF$_2$, HfF$_4$, or ZrF$_4$.

In some embodiments, the nanostructure comprises a core comprising ZnSe and a metal fluoride comprising ZnF$_2$, HfF$_4$, or ZrF$_4$; at least one shell comprising ZnSe, and at least one shell comprising ZnS and a metal fluoride comprising ZnF$_2$, HfF$_4$, or ZrF$_4$.

In some embodiments, the nanostructure comprises a core comprising ZnSe and a metal fluoride comprising ZnF$_2$, HfF$_4$, and ZrF$_4$; and at least one shell comprising ZnS.

In some embodiments, the nanostructure comprises a core comprising ZnSe and a metal fluoride comprising ZnF$_2$, HfF$_4$, or ZrF$_4$; at least one shell comprising ZnSe; and at least one shell comprising ZnS.

In some embodiments, the nanostructure comprises a core comprising ZnSe$_{1-x}$Te$_x$, wherein 0<x<1, and a metal fluoride comprising ZnF$_2$, HfF$_4$, or ZrF$_4$; and at least one shell comprising ZnS and a metal fluoride comprising ZnF$_2$, HfF$_4$, or ZrF$_4$.

In some embodiments, the nanostructure comprises a core comprising ZnSe$_{1-x}$Te$_x$, wherein 0<x<1, and a metal fluoride comprising ZnF$_2$, HfF$_4$, or ZrF$_4$; at least one shell comprising ZnSe; and at least one shell comprising ZnS and a metal fluoride comprising ZnF$_2$, HfF$_4$, or ZrF$_4$.

In some embodiments, the nanostructure comprises a core comprising ZnSe$_{1-x}$Te$_x$, wherein 0<x<1, and a metal fluoride comprising ZnF$_2$, HfF$_4$, or ZrF$_4$; and at least one shell comprising ZnS.

In some embodiments, the nanostructure comprises a core comprising ZnSe$_{1-x}$Te$_x$, wherein 0<x<1, and a metal fluoride comprising ZnF$_2$, HfF$_4$, or ZrF$_4$; at least one shell comprising ZnSe; and at least one shell comprising ZnS.

In some embodiments, the nanostructure is a quantum dot.

In some embodiments, the nanostructure is substantially cubic in shape.

In some embodiments, the present disclosure provides a method of preparing a nanostructure, comprising:
(a) admixing a solution of a zinc source, a selenium source, and a first metal fluoride source to provide a core comprising ZnSe or ZnSe$_{1-x}$Te$_x$, wherein 0≤x<1, and the first metal fluoride;
(b) optionally admixing the core in (a) with a zinc source and a selenium source to provide a core with a ZnSe shell;
(c) optionally admixing the core in (a) or the core with a ZnSe shell in (b) with a second metal fluoride source; and
(d) infusing a solution comprising a zinc source and a sulfur source into the admixture in (a), (b), or (c);
to provide a nanostructure.

In some embodiments, the admixing in (a) is at a temperature between about 20° C. and about 120° C. In some embodiments, the admixing in (a) is at a temperature of about 100° C.

In some embodiments, the admixing in (b) is at a temperature between about 250° C. and about 350° C. In some embodiments, the admixing in (b) is at a temperature of about 310° C.

In some embodiments, the admixing in (c) is at a temperature between about 20° C. and about 120° C. In some embodiments, the admixing in (c) is at a temperature of about 100° C.

In some embodiments, the infusing in (d) is at a temperature between about 250° C. and about 350° C. In some embodiments, the infusing in (d) is at a temperature of about 310° C.

In some embodiments, the infusing in (d) is at an infusing rate between about 0.05 mL/min and about 5.0 mL/min. In some embodiments, the infusing in (d) is at an infusing rate of about 0.5 mL/min.

In some embodiments, the selenium source in (a) comprises trioctylphosphine selenide, tri(n-butyl)phosphine selenide, tri(sec-butyl)phosphine selenide, tri(tert-butyl) phosphine selenide, trimethylphosphine selenide, triphenylphosphine selenide, diphenylphosphine selenide, phenylphosphine selenide, cyclohexylphosphine selenide, octaselenol, dodecaselenol, selenophenol, elemental selenium, hydrogen selenide, bis(trimethylsilyl) selenide, or mixtures thereof. In some embodiments, the selenium source in (a) is trioctylphosphine selenide.

In some embodiments, the zinc source in (a) comprises diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source in (a) is zinc oleate.

In some embodiments, the first metal fluoride in (a) comprises ZnF$_2$, HfF$_4$, or ZrF$_4$. In some embodiments, the first metal fluoride source in (a) is ZnF$_2$. In some embodiments, the first metal fluoride source in (a) is HfF$_4$. In some embodiments, the first metal fluoride source in (a) is ZrF$_4$.

In some embodiments, the zinc source in (b) comprises diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source in (b) is zinc oleate.

In some embodiments, the selenium source in (b) comprises trioctylphosphine selenide, tri(n-butyl)phosphine selenide, tri(sec-butyl)phosphine selenide, tri(tert-butyl) phosphine selenide, trimethylphosphine selenide, triphenylphosphine selenide, diphenylphosphine selenide, phenylphosphine selenide, cyclohexylphosphine selenide, octaselenol, dodecaselenol, selenophenol, elemental selenium, hydrogen selenide, bis(trimethylsilyl) selenide, or mixtures thereof. In some embodiments, the selenium source in (b) is trioctylphosphine selenide.

In some embodiments, the second metal fluoride in (c) comprises ZnF$_2$, HfF$_4$, or ZrF$_4$. In some embodiments, the second metal fluoride source in (c) is ZnF$_2$. In some embodiments, the second metal fluoride source in (c) is HfF$_4$. In some embodiments, the second metal fluoride source in (c) is ZrF$_4$.

In some embodiments, the zinc source in (d) comprises diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source in (d) is zinc oleate.

In some embodiments, the sulfur source in (d) comprises trioctylphosphine sulfide, elemental sulfur, octanethiol, dodecanethiol, octadecanethiol, tributylphosphine sulfide, cyclohexyl isothiocyanate, α-toluenethiol, ethylene trithiocarbonate, allyl mercaptan, bis(trimethylsilyl) sulfide, trioctylphosphine sulfide, or combinations thereof. In some embodiments, the sulfur source in (d) is trioctylphosphine sulfide.

In some embodiments, the present disclosure provides a device comprising the nanostructure of the present disclosure. In some embodiments, the device is a display device.

In some embodiments, the display device comprises a quantum dot color converter comprising:
 a back plane;
 a display panel disposed on the back plane; and
 a patterned quantum dot layer comprising the nanostructure, the patterned quantum dot layer disposed on the display panel.

In some embodiments, the backplane comprises a blue LED, an LCD, an OLED, or a microLED.

In some embodiments, the present disclosure provides a nanostructure film comprising at least one population of nanostructures, the nanostructures comprising a core comprising a nanocrystal core; and at least one shell disposed on the core, wherein at least one shell comprises ZnS and fluoride.

In some embodiments, the present disclosure provides a nanostructure film comprising at least one population of nanostructures, the nanostructures comprising a core comprising ZnSe or $ZnSe_{1-x}Te_x$, wherein $0 \leq x < 1$, and a first metal fluoride; and at least one shell disposed on the core, wherein at least one shell comprises ZnS and optionally a second metal fluoride.

In some embodiments, the nanostructure film further comprises at least one organic resin. In some embodiments, the nanostructure film comprises between one and five organic resins. In some embodiments, the nanostructure film comprises one organic resin. In some embodiments, the at least one organic resin is a thermosetting resin or a UV curable resin. In some embodiments, the at least one organic resin is a UV curable resin.

In some embodiments, the present disclosure provides a molded article comprising the nanostructure film.

In some embodiments, the molded article comprising:
 (a) a first barrier layer;
 (b) a second barrier layer; and
 (c) an emitting layer between the first barrier layer and the second barrier layer, wherein the emitting layer comprises a population of nanostructures comprising a core comprising a nanocrystal core; and at least one shell disposed on the core, wherein at least one shell comprises ZnS and fluoride.

In some embodiments, the molded article comprising:
 (a) a first barrier layer;
 (b) a second barrier layer; and
 (c) an emitting layer between the first barrier layer and the second barrier layer, wherein the emitting layer comprises a population of nanostructures comprising a core comprising ZnSe or $ZnSe_{1-x}Te_x$, wherein $0 \leq x < 1$, and a first metal fluoride; and at least one shell disposed on the core, wherein at least one shell comprises ZnS and optionally a second metal fluoride.

In some embodiments, the nanostructure is a quantum dot.

In some embodiments, the molded article is an electroluminescent device. In some embodiments, the molded article is a light emitting diode. In some embodiments, the molded article is a liquid crystal display.

In some embodiments, the maximum external quantum efficiency (EQE) of the electroluminescent device is between about 1.5% and about 15%.

In some embodiments, the maximum external quantum efficiency (EQE) of the electroluminescent device is about 5%.

In some embodiments, the electroluminescent device reaches 50% of initial luminance of 500 $cd/m^2$ (nits) after between about 19 seconds and about 35 seconds.

In some embodiments, the time for the electroluminescent device to reach 50% of initial luminance of 500 $cd/m^2$ (nits) (T50) is at least about three times longer than the T50 for an electroluminescent device comprising the corresponding nanostructure without any fluoride in the shell.

DETAILED DESCRIPTION OF THE INVENTION

Definitions

Figure 1:
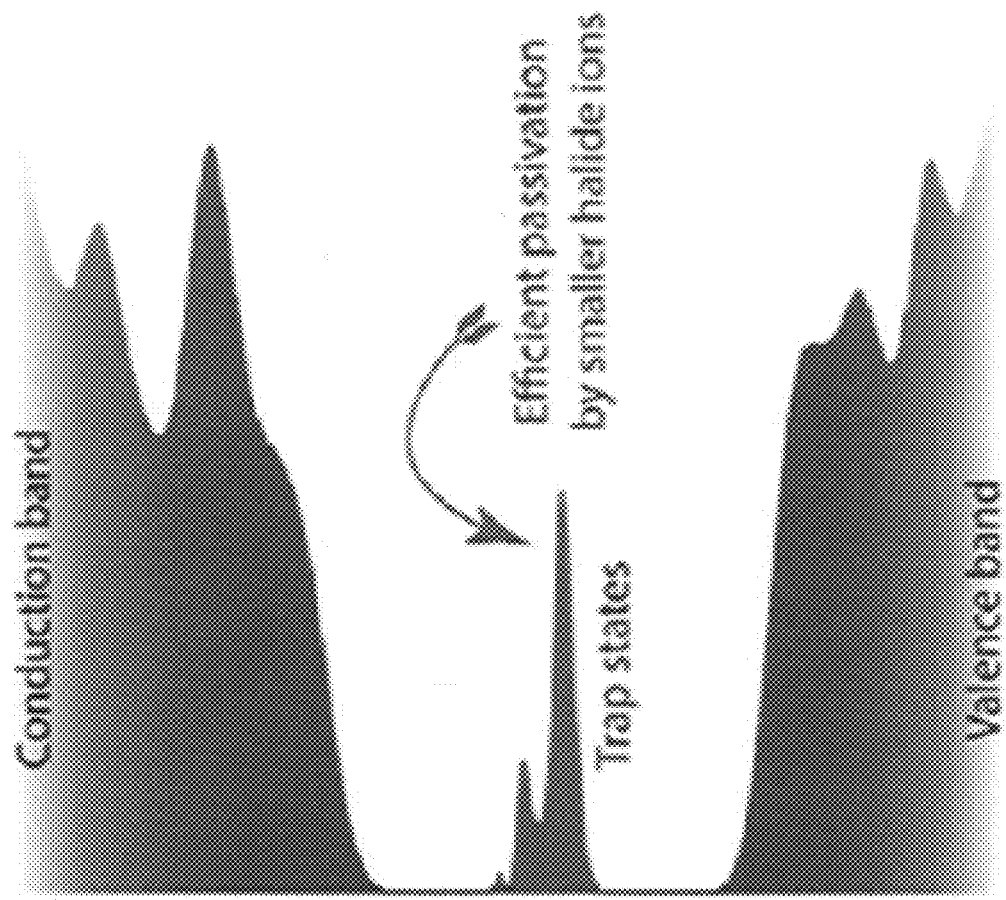
FIG. 1 is a schematic of the density of states diagram with the midgap trap states indicated as "trap states." Full surface coverage by halide ions reduces the midgap trap states, forming a better electronically balanced quantum dot.

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in the practice for testing of the present invention, the preferred materials and methods are described herein. Accordingly, the terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "a nanostructure" includes a plurality of such nanostructures, and the like.

The term "about" as used herein indicates the value of a given quantity varies by ±10% of the value. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, nanotripods, nanobipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can, but need not, completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell can contain non-crystalline regions and can even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

A "ligand" is a molecule capable of interacting (whether weakly or strongly) with one or more faces of a nanostructure, e.g., through covalent, ionic, van der Waals, or other molecular interactions with the surface of the nanostructure.

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

As used herein, the term "monolayer" is a measurement unit of shell thickness derived from the bulk crystal structure of the shell material as the closest distance between relevant lattice planes. By way of example, for cubic lattice structures the thickness of one monolayer is determined as the distance between adjacent lattice planes in the [111] direction. By way of example, one monolayer of cubic ZnSe corresponds to 0.33 nm and one monolayer of cubic ZnS corresponds to 0.31 nm thickness. The thickness of a monolayer of alloyed materials can be determined from the alloy composition through Vegard's law.

As used herein, the term "shell" refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, "target shell thickness" refers to the intended shell thickness used for calculation of the required precursor amount. As used herein, "actual shell thickness" refers to the actually deposited amount of shell material after the synthesis and can be measured by methods known in the art. By way of example, actual shell thickness can be measured by comparing particle diameters determined from TEM images of nanocrystals before and after a shell synthesis.

As used herein, the term "full width at half-maximum" (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

"Peak emission wavelength" (PWL) is the wavelength where the radiometric emission spectrum of the light source reaches its maximum.

As used herein, the term "external quantum efficiency" (EQE) is a ratio of the number of photons emitted from a light emitting diode (LED) to the number of electrons passing through the device. The EQE measures how efficiently a LED converts electrons to photons and allows them to escape. EQE can be measured using the formula:

$$EQE = [\text{injection efficiency}] \times [\text{solid-state quantum yield}] \times [\text{extraction efficiency}]$$

where:
injection efficiency=the proportion of electrons passing through the device that are injected into the active region;
solid-state quantum yield=the proportion of all electron-hole recombinations in the active region that are radiative and thus, produce photons; and
extraction efficiency=the proportion of photons generated in the active region that escape from the device.

Unless clearly indicated otherwise, ranges listed herein are inclusive.

A variety of additional terms are defined or otherwise characterized herein.

Nanostructure

In some embodiments, the present disclosure provides a nanostructure comprising a core comprising a nanocrystal core; and at least one shell disposed on the core, wherein at least one shell comprises ZnS and fluoride.

In some embodiments, the core comprises ZnSe, ZnSeTe, InP, or InAs.

In some embodiments, the core comprises $ZnSe_{1-x}Te_x$, wherein $0 \leq x < 1$.

In some embodiments, the nanostructure comprises two shells.

In some embodiments, at least one shell comprises a first shell comprising ZnSe and a second shell comprising ZnS and fluoride. In some embodiments, at least one shell comprises a first shell comprising ZnSe and fluoride, and a second shell comprising ZnS and fluoride.

In some embodiments, the fluoride is in the form of a metal fluoride, ammonium fluoride, or tetraalkylammonium fluoride.

In some embodiments, the nanostructure is a quantum dot.

In some embodiments, the fluoride is in the form of a metal fluoride selected from the group consisting of $ZnF_2$, $HfF_4$, and $ZrF_4$. In some embodiments, the metal fluoride is $ZnF_2$.

In some embodiments, the present disclosure provides a nanostructure comprising a core comprising ZnSe or $ZnSe_{1-x}Te_x$, wherein $0 \leq x < 1$, and a first metal fluoride; and at least one shell disposed on the core, wherein at least one shell comprises ZnS and optionally a second metal fluoride.

In some embodiments, the nanostructure comprises two shells.

In some embodiments, the first metal fluoride is selected from the group consisting of $ZnF_2$, $HfF_4$, and $ZrF_4$.

In some embodiments, the second metal fluoride is selected from the group consisting of $ZnF_2$, $HfF_4$, and $ZrF_4$.

In some embodiments, the nanostructure is a quantum dot.

In some embodiments, the nanostructure further comprises at least one amine. In some embodiments, at least one amine is bound to the surface of the nanostructure.

In some embodiments, the present disclosure provides a nanostructure comprising a core comprising a nanocrystal core; at least one shell disposed on the core, wherein at least one shell comprises ZnS and fluoride; and at least one amine bound to the surface of the nanostructure.

In some embodiments, the present disclosure provides a nanostructure comprising a core comprising a nanocrystal core; at least one shell disposed on the core, wherein at last one shell comprises ZnS or ZnSe; at least one fluoride bound to the surface of the nanostructure; and at least one amine bound to the surface of the nanostructure.

Nanostructure Film

In some embodiments, the present disclosure provides a nanostructure film comprising at least one population of nanostructures, the nanostructures comprising a core comprising a nanocrystal core; and at least one shell disposed on the core, wherein at least one shell comprises ZnS and fluoride.

In some embodiments, the present disclosure provides a nanostructure film comprising at least one population of nanostructures, the nanostructures comprising a core comprising a nanocrystal core; at least one shell disposed on the core, wherein at least one shell comprises ZnS or ZnSe; at least one fluoride bound to the surface of the nanostructures; and at least one amine bound to the surface of the nanostructures.

In some embodiments, the present disclosure provides a nanostructure film comprising at least one population of nanostructures, the nanostructures comprising a core comprising ZnSe or $ZnSe_{1-x}Te_x$, wherein $0 \leq x < 1$, and a first metal fluoride; and at least one shell disposed on the core, wherein at least one shell comprises ZnS and optionally a second metal fluoride.

In some embodiments, the present disclosure provides a nanostructure film comprising at least one population of nanostructures, the nanostructures comprising a core comprising InP; at least one shell disposed on the core, wherein at least one shell comprises ZnS or ZnSe; at least one fluoride bound to the surface of the nanostructures; and at least one amine bound to the surface of the nanostructures.

In some embodiments, the nanostructure film further comprises at least one organic resin.

In some embodiments, the nanostructure is a quantum dot.

Nanostructure Molded Article

In some embodiments, the present disclosure provides a molded article comprising a nanostructure film described herein.

In some embodiments, the molded article comprises:
(a) a first barrier layer;
(b) a second barrier layer; and
(c) an emitting layer between the first barrier layer and the second barrier layer, wherein the emitting layer comprises a population of nanostructures comprising a core comprising a nanocrystal core; and at least one shell disposed on the core, wherein at least one shell comprises ZnS and fluoride.

In some embodiments, the molded article comprises:
(a) a first barrier layer;
(b) a second barrier layer; and
(c) an emitting layer between the first barrier layer and the second barrier layer, wherein the emitting layer comprises a population of nanostructures comprising a core comprising a nanocrystal core; at least one shell disposed on the core, wherein at least one shell comprises ZnS or ZnSe; at least one fluoride bound to the surface of the nanostructures; and at least one amine bound to the surface of the nanostructures.

In some embodiments, the molded article comprises:
(a) a first barrier layer;
(b) a second barrier layer; and
(c) an emitting layer between the first barrier layer and the second barrier layer, wherein the emitting layer comprises a population of nanostructures comprising a core comprising ZnSe or $ZnSe_{1-x}Te_x$, wherein $0 \leq x < 1$, and a first metal fluoride; and at least one shell disposed on the core, wherein at least one shell comprises ZnS and optionally a second metal fluoride.

In some embodiments, the molded article comprises:
(a) a first barrier layer;
(b) a second barrier layer; and
(c) an emitting layer between the first barrier layer and the second barrier layer, wherein the emitting layer comprises a population of nanostructures comprising a core comprising InP; at least one shell disposed on the core, wherein at least one shell comprises ZnS or ZnSe; at least one fluoride bound to the surface of the nanostructures; and at least one amine bound to the surface of the nanostructures.

In some embodiments, the nanostructure is a quantum dot.

In some embodiments, the molded article is an electroluminescent device. In some embodiments, the molded article is a light emitting diode. In some embodiments, the molded article is a liquid crystal display.

Production of Nanostructures

Methods for colloidal synthesis of a variety of nanostructures are known in the art. Such methods include techniques for controlling nanostructure growth, e.g., to control the size and/or shape distribution of the resulting nanostructures.

In a typical colloidal synthesis, semiconductor nanostructures are produced by rapidly injecting precursors that undergo pyrolysis into a hot solution (e.g., hot solvent and/or surfactant). The precursors can be injected simultaneously or sequentially. The precursors rapidly react to form nuclei. Nanostructure growth occurs through monomer addition to the nuclei.

Surfactant molecules interact with the surface of the nanostructure. At the growth temperature, the surfactant molecules rapidly adsorb and desorb from the nanostructure surface, permitting the addition and/or removal of atoms from the nanostructure while suppressing aggregation of the growing nanostructures. In general, a surfactant that coordinates weakly to the nanostructure surface permits rapid growth of the nanostructure, while a surfactant that binds more strongly to the nanostructure surface results in slower nanostructure growth. The surfactant can also interact with one (or more) of the precursors to slow nanostructure growth.

Nanostructure growth in the presence of a single surfactant typically results in spherical nanostructures. Using a mixture of two or more surfactants, however, permits growth to be controlled such that non-spherical nanostructures can be produced, if, for example, the two (or more) surfactants adsorb differently to different crystallographic faces of the growing nanostructure.

A number of parameters are thus known to affect nanostructure growth and can be manipulated, independently or in combination, to control the size and/or shape distribution of the resulting nanostructures. These include, e.g., temperature (nucleation and/or growth), precursor composition, time-dependent precursor concentration, ratio of the precursors to each other, surfactant composition, number of surfactants, and ratio of surfactant(s) to each other and/or to the precursors.

Synthesis of Group II-VI nanostructures has been described, e.g., in U.S. Pat. Nos. 6,225,198, 6,322,901, 6,207,229, 6,607,829, 7,060,243, 7,374,824, 6,861,155, 7,125,605, 7,566,476, 8,158,193, and 8,101,234 and U.S. Patent Appl. Publication Nos. 2011/0262752 and 2011/0263062, each of which is incorporated herein by reference in their entireties.

Although Group II-VI nanostructures such as CdSe/CdS/ZnS core/shell nanostructures can exhibit desirable luminescence behavior, as noted above, issues such as the toxicity of cadmium limit the applications for which such nanostructures can be used. Less toxic alternatives with favorable luminescence properties are thus highly desirable.

In some embodiments, the nanostructures are free from cadmium. As used herein, the term "free of cadmium" is intended that the nanostructures contain less than 100 ppm by weight of cadmium. The Restriction of Hazardous Substances (RoHS) compliance definition requires that there must be no more than 0.01% (100 ppm) by weight of cadmium in the raw homogeneous precursor materials. The cadmium level in the Cd-free nanostructures of the present invention is limited by the trace metal concentration in the precursor materials. The trace metal (including cadmium) concentration in the precursor materials for the Cd-free nanostructures, is measured by inductively coupled plasma mass spectroscopy (ICP-MS) analysis, and are on the parts per billion (ppb) level. In some embodiments, nanostructures that are "free of cadmium" contain less than about 50 ppm, less than about 20 ppm, less than about 10 ppm, or less than about 1 ppm of cadmium.

In some embodiments, the nanostructure comprises a nanocrystal core. In some embodiments, the core comprises ZnSe, ZnSeTe, InP, or InAs. In some embodiments, the core comprises $ZnSe_{1-x}Te_x$, wherein 0≤x<1. In some embodiments, the core comprises ZnSe. In some embodiments, the core comprises InP.

In some embodiments, the nanostructure comprises at least one shell disposed on the core. In some embodiments, at least one shell comprises ZnSe. In some embodiments, at least one shell comprises ZnS. In some embodiments, at least one shell comprises ZnSe and at least one shell comprises ZnS.

In some embodiments, at least one shell comprises ZnS and fluoride. In some embodiments, the nanostructure comprises two shells. In some embodiments, at least one shell comprises ZnSe. In some embodiments, at least one shell comprises ZnSe and fluoride. In some embodiments, at least one shell comprises a first shell comprising ZnSe and a second shell comprising ZnS and fluoride. In some embodiments, the at least one shell comprises a first shell comprising ZnSe and fluoride, and a second shell comprising ZnS and fluoride. In some embodiments, the fluoride is in the form of a metal fluoride, ammonium fluoride, or tetraalkylammonium fluoride. In some embodiments, the fluoride is in the form of a metal fluoride selected from the group consisting of $ZnF_2$, $HfF_4$, and $ZrF_4$. In some embodiments, the metal fluoride is $ZnF_2$.

In some embodiments, the nanostructure comprises a core comprising InP and at least one shell comprising ZnS or ZnSe. In some embodiments, the nanostructure comprises a core comprising InP, at least one shell comprising ZnS, and at least one shell comprising ZnSe.

In some embodiments, the nanostructure comprises a core comprising ZnSe, and at least one shell comprising ZnS and $ZnF_2$. In some embodiments, the nanostructure comprises a core comprising ZnSe, at least one shell comprising ZnSe, and at least one shell comprising ZnS and $ZnF_2$. In some embodiments, the nanostructure comprises a core comprising ZnSe, at least one shell comprising ZnSe and $ZnF_2$, and at least one shell comprising ZnS and $ZnF_2$. In some embodiments, the nanostructure comprises a core comprising $ZnSe_{1-x}Te_x$, wherein 0≤x<1, and at least one shell comprising ZnS and $ZnF_2$. In some embodiments, wherein the nanostructure comprises a core comprising $ZnSe_{1-x}Te_x$, wherein 0≤x<1, at least one shell comprising ZnSe, and at least one shell comprising ZnS and $ZnF_2$. In some embodiments, the nanostructure comprises a core comprising $ZnSe_{1-x}Te_x$, wherein 0≤x<1, at least one shell comprising ZnSe and $ZnF_2$, and at least one shell comprising ZnS and $ZnF_2$.

In some embodiments, the nanostructure comprises a core comprising ZnSe or $ZnSe_{1-x}Te_x$, wherein 0≤x<1, and a first metal fluoride. In some embodiments, the core comprises $ZnSe_{1-x}Te_x$, wherein 0≤x<1, and a first metal fluoride. In some embodiments, the core comprises ZnSe and a first metal fluoride. In some embodiments, the first metal fluoride is selected from the group consisting of $ZnF_2$, $HfF_4$, and $ZrF_4$.

In some embodiments, the nanostructure comprises at least one shell disposed on the core. In some embodiments, at least one shell comprises ZnS and optionally a second metal fluoride. In some embodiments, the nanostructure comprises two shells. In some embodiments, at least one shell comprises ZnSe. In some embodiments, at least one shell comprises a first shell comprising ZnSe and a second shell comprising ZnS and optionally a second metal fluoride. In some embodiments, the second metal fluoride is selected from the group consisting of $ZnF_2$, $HfF_4$, and $ZrF_4$.

In some embodiments, the nanostructure comprises a core comprising ZnSe and a metal fluoride selected from the group consisting of $ZnF_2$, $HfF_4$, and $ZrF_4$; and at least one shell comprising ZnS and a metal fluoride selected from the group consisting of $ZnF_2$, $HfF_4$, and $ZrF_4$.

In some embodiments, the nanostructure comprises a core comprising ZnSe and a metal fluoride selected from the group consisting of $ZnF_2$, $HfF_4$, and $ZrF_4$; at least one shell comprising ZnSe, and at least one shell comprising ZnS and a metal fluoride selected from the group consisting of $ZnF_2$, $HfF_4$, and $ZrF_4$.

In some embodiments, the nanostructure comprises a core comprising ZnSe and a metal fluoride selected from the group consisting of $ZnF_2$, $HfF_4$, and $ZrF_4$; and at least one shell comprising ZnS.

In some embodiments, the nanostructure comprises a core comprising ZnSe and a metal fluoride selected from the group consisting of $ZnF_2$, $HfF_4$, and $ZrF_4$; at least one shell comprising ZnSe; and at least one shell comprising ZnS.

In some embodiments, the nanostructure comprises a core comprising $ZnSe_{1-x}Te_x$, wherein 0<x<1, and a metal fluoride selected from the group consisting of $ZnF_2$, $HfF_4$, and $ZrF_4$; and at least one shell comprising ZnS and a metal fluoride selected from the group consisting of $ZnF_2$, $HfF_4$, and $ZrF_4$.

In some embodiments, the nanostructure comprises a core comprising $ZnSe_{1-x}Te_x$, wherein 0<x<1, and a metal fluoride selected from the group consisting of $ZnF_2$, $HfF_4$, and $ZrF_4$; at least one shell comprising ZnSe; and at least one shell comprising ZnS and a metal fluoride selected from the group consisting of $ZnF_2$, $HfF_4$, and $ZrF_4$.

In some embodiments, the nanostructure comprises a core comprising $ZnSe_{1-x}Te_x$, wherein $0<x<1$, and a metal fluoride selected from the group consisting of $ZnF_2$, $HfF_4$, and $ZrF_4$; and at least one shell comprising ZnS.

In some embodiments, the nanostructure comprises a core comprising $ZnSe_{1-x}Te_x$, wherein $0<x<1$, and a metal fluoride selected from the group consisting of $ZnF_2$, $HfF_4$, and $ZrF_4$; at least one shell comprising ZnSe; and at least one shell comprising ZnS.

In some embodiments, the nanostructure is prepared using the method of U.S. Application Publication No. 2017/0306227, which is incorporated by reference in its entirety.

In some embodiments, the nanostructure is a quantum dot.

In some embodiments, the nanostructure is substantially cubic in shape.

Solvents

In some embodiments, the nanostructure further comprises a solvent.

In some embodiments, the solvent is selected from the group consisting of chloroform, acetone, hexane, heptane, octane, butanone, ethylene glycol monoethyl ether, ethylene glycol monopropyl ether, 1,4-butanediol diacetate, diethylene glycol monobutyl ether acetate, ethylene glycol monobutyl ether acetate, glyceryl triacetate, heptyl acetate, hexyl acetate, pentyl acetate, butyl acetate, ethyl acetate, diethylene glycol butyl methyl ether, diethylene glycol monobutyl ether, di(proyplene glycol) dimethyl ether, diethylene glycol ethyl methyl ether, ethylene glycol monobutyl ether, diethylene glycol diethyl ether, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof.

In some embodiments, the solvent is a non-polar solvent. In some embodiments, the non-polar solvent is selected from the group consisting of hexane, heptane, octane, toluene, and mixtures thereof. In some embodiments, the non-polar solvent is octane. In some embodiments, the non-polar solvent is hexane.

Production of Nanostructures with Fluoride Passivation in the Shell

In some embodiments, the present disclosure provides a method of preparing a nanostructure, comprising:
(a) providing a nanocrystal core;
(b) optionally admixing the core in (a) with a zinc source and a selenium source to provide a core with a ZnSe shell;
(c) admixing the core in (a) or the core with a ZnSe shell in (b) with a fluoride source; and
(d) infusing a solution comprising a zinc source and a sulfur source into the admixture in (c);
to provide the nanostructure.

In some embodiments, the core comprises ZnSe, ZnSeTe, InP, or InAs. In some embodiments, the core comprises $ZnSe_{1-x}Te_x$, wherein $0 \leq x < 1$. In some embodiments, the core comprises ZnSe.

In some embodiments, the molar ratio of the fluoride source to the nanocrystal core is between about 1:1 and about 30:1, about 1:1 and about 25:1, about 1:1 and about 20:1, about 1:1 and about 15:1, about 1:1 and about 10:1, about 1:1 and about 9:1, about 1:1 and about 8:1, about 1:1 and about 7:1, 1:1 and about 6:1, about 1:1 and about 5:1, about 1:1 and about 4:1, about 1:1 and about 3:1, or about 1:1 and about 2:1. In some embodiments, the molar ratio of the fluoride source to the nanocrystal core is about 1:1, about 2:1, about 3:1, about 4:1, about 5:1, about 6:1, about 7:1, about 8:1, about 9:1, about 10:1, about 11:1, about 12:1, about 13:1, about 14:1, about 15:1, about 16:1, about 17:1, about 18:1, about 19:1, about 20:1, about 21:1, about 22:1, about 23:1, about 24:1, about 25:1, about 26:1, about 27:1, about 28:1, about 29:1, or about 30:1.

In some embodiments, the zinc source in (b) is a dialkyl zinc compound. In some embodiments, the zinc source in (b) is a zinc carboxylate. In some embodiments, the zinc source in (b) is diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source in (b) is zinc oleate, zinc hexanoate, zinc octanoate, zinc laurate, zinc myristate, zinc palmitate, zinc stearate, zinc dithiocarbamate, or mixtures thereof. In some embodiments, the zinc source in (b) is zinc oleate.

In some embodiments, the selenium source in (b) is an alkyl-substituted selenourea. In some embodiments, the selenium source in (b) is a phosphine selenide. In some embodiments, the selenium source in (b) is selected from trioctylphosphine selenide, tri(n-butyl)phosphine selenide, tri(sec-butyl)phosphine selenide, tri(tert-butyl)phosphine selenide, trimethylphosphine selenide, triphenylphosphine selenide, diphenylphosphine selenide, phenylphosphine selenide, tricyclohexylphosphine selenide, cyclohexylphosphine selenide, 1-octaneselenol, 1-dodecaneselenol, selenophenol, elemental selenium, hydrogen selenide, bis(trimethylsilyl) selenide, selenourea, and mixtures thereof. In some embodiments, the selenium source in (b) is tri(n-butyl)phosphine selenide, tri(sec-butyl)phosphine selenide, or tri(tert-butyl)phosphine selenide. In some embodiments, the selenium source in (b) is trioctylphosphine selenide.

In some embodiments, the admixing in (b) is at a temperature between about 250° C. and about 350° C. In some embodiments, the admixing in (b) is at a temperature of about 310° C.

In some embodiments, the admixing in (b) comprises admixing the core in (a) with a zinc source, a selenium source, and optionally a fluoride source to provide a core with a shell comprising ZnSe and fluoride.

In some embodiments, the fluoride source is a metal fluoride, ammonium fluoride, or tetraalkylammonium fluoride.

In some embodiments, the fluoride source is a metal fluoride selected from the group consisting of $ZnF_2$, $HfF_4$, and $ZrF_4$. In some embodiments, the metal fluoride is $ZnF_2$. In some embodiments, the metal fluoride is $HfF_4$. In some embodiments, the metal fluoride is $ZrF_4$.

In some embodiments, the fluoride source is a tetraalkylammonium fluoride selected from the group consisting of tetrabutylammonium fluoride, tetrapropylammonium fluoride, diisopropyldimethylammonium fluoride, tetraethylammonium fluoride, and tetramethylammonium fluoride, dioctadecyldimethylammonium fluoride, dihexadecyldimethylammonium fluoride, ditetradecyldimethylammonium fluoride, didodecyldimethylammonium fluoride, didecyldimethylammonium fluoride, dioctyldimethylammonium fluoride, bis(ethylhexyl)dimethylammonium fluoride, octadecyltrimethylammonium fluoride, oleyltrimethylammonium fluoride, hexadecyltrimethylammonium fluoride, tetradecyltrimethylammonium fluoride, dodecyltrimethylammonium fluoride, decyltrimethylammonium fluoride, octyltrimethylammonium fluoride, phenylethyltrimethylammonium fluoride, benzyltrimethylammonium fluoride, phenyltrimethylammonium fluoride, benzylhexadecyldimethylammonium fluoride, benzyltetradecyldimethylammonium fluoride, benzyldodecyldimethylammonium fluoride, benzyldecyldimethylammonium fluoride, benzyloctyldimethylammonium fluoride, benzyltributylammonium fluoride, and benzyltriethylammonium fluoride.

In some embodiments, the tetraalkylammonium fluoride is tetrabutylammonium fluoride.

In some embodiments, the admixing in (c) is at a temperature between about 20° C. and about 120° C. In some embodiments, the admixing in (c) is at a temperature of about 100° C.

In some embodiments, the admixing in (c) further comprises an amine source.

In some embodiments, the amine source is a lower alkyl amine, an alkenyl amine, a hydroalkyl amine, a haloalkyl amine, a primary aryl amine, a secondary aryl amine, or a heterocyclic amine. In some embodiments, the amine source is a secondary amine, i.e., amines having an amine group containing two C—N bonds and one N—H bond. In some embodiments, the amine source contains a total of 20 carbon atoms or less. In some embodiments, the amine source contains 10 carbon atoms or less. Examples of primary amines are alkylamines, such as ethylamine, butylamine, hexylamine, octylamine, decylamine, hexadecylamine, and octadecylamine; alkenylamines, such as allylamine, 2-hexenylamine, 4-decenylamine, and octadecenyl amines; alkanolamines, such as ethanolamine, octanolamine, and dodecanolamine; haloalkylamines, such as betachloroethylamine; and arylamines, such as aniline. Examples of secondary amines which may be used to prepare the compounds described herein include dialkylamines, such as diethylamine, di-n-propylamine, diisobutylamine, dihexylamine and dioctylamine; dialkenylamines, such as diallylamine and dihexenylamine; dialkanolamines, such as diethanolamine and didecanolamine; dihaloalkylamines, such as bis(betachloroethyl) amine; and N,N'-dialkylalkylenediamines, such as N,N-dimethylethylenediamine. The secondary amines do not necessarily have to contain two identical substituents. Examples of such mixed amines include N-methylethanolamine, N-methylallylamine and N-methylaniline. Additional secondary amines include those amines in which the amine nitrogen is contained within a heterocyclic ring. In some embodiments, the heterocyclic amines are six-membered ring heterocyclic amines. Examples of such heterocyclic amines include morpholine, piperidine, pyrrolidine, N-methylpiperazine, hexamethyleneimine, and thiomorpholine. In some embodiments, the heterocyclic amine may contain additional hetero atoms, for example, nitrogen, oxygen, or sulfur.

In some embodiments, the zinc source in (d) is a dialkyl zinc compound. In some embodiments, the zinc source in (d) is a zinc carboxylate. In some embodiments, the zinc source in (d) is diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source in (d) is zinc oleate, zinc hexanoate, zinc octanoate, zinc laurate, zinc myristate, zinc palmitate, zinc stearate, zinc dithiocarbamate, or mixtures thereof. In some embodiments, the zinc source in (d) is zinc oleate.

In some embodiments, the sulfur source in (d) is selected from the group consisting of trioctylphosphine sulfide, elemental sulfur, octanethiol, dodecanethiol, octadecanethiol, tributylphosphine sulfide, cyclohexyl isothiocyanate, α-toluenethiol, ethylene trithiocarbonate, allyl mercaptan, bis(trimethylsilyl) sulfide, trioctylphosphine sulfide, and combinations thereof. In some embodiments, the sulfur source in (d) is trioctylphosphine sulfide.

In some embodiments, the infusing in (d) is at a temperature between about 280° C. and about 320° C. In some embodiments, the infusing in (d) is at a temperature of about 310° C.

In some embodiments, the infusing in (d) is at an infusing rate between about 0.05 mL/min and about 5.0 mL/min. In some embodiments, the infusing in (d) is at an infusing rate of about 0.1 mL/min.

In some embodiments, the molar ratio of fluoride bound to the nanostructure to zinc in the nanostructure is between about 0.05 and about 0.35. In some embodiments, the molar ratio of fluoride bound to the nanostructure to zinc in the nanostructure is about 0.13.

In some embodiments, the nanostructure is cooled to room temperature. In some embodiments, an organic solvent is added to dilute the reaction mixture comprising the nanostructure.

In some embodiments, the organic solvent used to dilute the reaction mixture is ethanol, hexane, pentane, toluene, benzene, diethylether, acetone, ethyl acetate, dichloromethane (methylene chloride), chloroform, dimethylformamide, or N-methylpyrrolidinone. In some embodiments, the organic solvent is toluene. In some embodiments, the organic solvent is a combination of toluene and ethanol.

In some embodiments, the nanostructures are isolated. In some embodiments, the nanostructure is isolated by precipitation using an organic solvent. In some embodiments, the nanostructure is isolated by flocculation with ethanol. In some embodiments, the nanostructures are further isolated by centrifugation followed by decanting of the organic solvent.

Production of Nanostructures With Fluoride Passivation in the Core

In some embodiments, the present disclosure provides a method of preparing a nanostructure, comprising:
  (a) admixing a solution of a zinc source, a selenium source, and a first metal fluoride source to provide a core comprising ZnSe or $ZnSe_{1-x}Te_x$, wherein $0 \leq x < 1$, and the first metal fluoride;
  (b) optionally admixing the core in (a) with a zinc source and a selenium source to provide a core with a ZnSe shell;
  (c) optionally admixing the core in (a) or the core with a ZnSe shell in (b) with a second metal fluoride source; and
  (d) infusing a solution comprising a zinc source and a sulfur source into the admixture in (a), (b), or (c);
to provide a nanostructure.

In some embodiments, the molar ratio of the first metal fluoride source to the core is between about 1:1 and 10:1, about 1:1 and about 9:1, about 1:1 and 8:1, about 1:1 and about 7:1, about 1:1 and about 6:1, about 1:1 and about 5:1, about 1:1 and about 4:1, about 1:1 and about 3:1, or about 1:1 and about 2:1. In some embodiments, the molar ratio of the first metal fluoride source to the core is about 1:1, about 2:1, about 3:1, about 4:1, about 5:1, about 6:1, about 7:1, about 8:1, about 9:1, or about 10:1.

In some embodiments, the molar ratio of the second metal fluoride source to the core is between about 1:1 and about 30:1, about 1:1 and about 25:1, about 1:1 and about 20:1, about 1:1 and about 15:1, about 1:1 and about 10:1, about 1:1 and about 9:1, about 1:1 and about 8:1, about 1:1 and about 7:1, 1:1 and about 6:1, about 1:1 and about 5:1, about 1:1 and about 4:1, about 1:1 and about 3:1, or about 1:1 and about 2:1. In some embodiments, the molar ratio of the second fluoride source to the nanocrystal core is about 1:1, about 2:1, about 3:1, about 4:1, about 5:1, about 6:1, about 7:1, about 8:1, about 9:1, about 10:1, about 11:1, about 12:1, about 13:1, about 14:1, about 15:1, about 16:1, about 17:1, about 18:1, about 19:1, about 20:1, about 21:1, about 22:1, about 23:1, about 24:1, about 25:1, about 26:1, about 27:1, about 28:1, about 29:1, or about 30:1.

In some embodiments, the selenium source in (a) is selected from the group consisting of trioctylphosphine selenide, tri(n-butyl)phosphine selenide, tri(sec-butyl)phosphine selenide, tri(tert-butyl)phosphine selenide, trimethylphosphine selenide, triphenylphosphine selenide, diphenylphosphine selenide, phenylphosphine selenide, cyclohexylphosphine selenide, octaselenol, dodecaselenol, selenophenol, elemental selenium, hydrogen selenide, bis(trimethylsilyl) selenide, and mixtures thereof. In some embodiments, the selenium source in (a) is trioctylphosphine selenide.

In some embodiments, the zinc source in (a) is a dialkyl zinc compound. In some embodiments, the zinc source in (a) is a zinc carboxylate. In some embodiments, the zinc source in (a) is diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source in (a) is zinc oleate, zinc hexanoate, zinc octanoate, zinc laurate, zinc myristate, zinc palmitate, zinc stearate, zinc dithiocarbamate, or mixtures thereof. In some embodiments, the zinc source in (a) is zinc oleate.

In some embodiments, the first metal fluoride in (a) is selected from the group consisting of $ZnF_2$, $HfF_4$, and $ZrF_4$. In some embodiments, the first metal fluoride source in (a) is $ZnF_2$. In some embodiments, the first metal fluoride source in (a) is $HfF_4$. In some embodiments, the first metal fluoride source in (a) is $ZrF_4$.

In some embodiments, the admixing in (a) further comprises a first amine source.

In some embodiments, the amine source is a lower alkyl amine, an alkenyl amine, a hydroalkyl amine, a haloalkyl amine, a primary aryl amine, a secondary aryl amine, or a heterocyclic amine. In some embodiments, the amine source is a secondary amine, i.e., amines having an amine group containing two C—N bonds and one N—H bond. In some embodiments, the amine source contains a total of 20 carbon atoms or less. In some embodiments, the amine source contains 10 carbon atoms or less. Examples of primary amines are alkylamines, such as ethylamine, butylamine, hexylamine, octylamine, decylamine, hexadecylamine, and octadecylamine; alkenylamines, such as allylamine, 2-hexenylamine, 4-decenylamine, and octadecenyl amines; alkanolamines, such as ethanolamine, octanolamine, and dodecanolamine; haloalkylamines, such as betachloroethylamine; and arylamines, such as aniline. Examples of secondary amines which may be used to prepare the compounds described herein include dialkylamines, such as diethylamine, di-n-propylamine, diisobutylamine, dihexylamine and dioctylamine; dialkenylamines, such as diallylamine and dihexenylamine; dialkanolamines, such as diethanolamine and didecanolamine; dihaloalkylamines, such as bis(betachloroethyl) amine; and N,N'-dialkylalkylenediamines, such as N,N-dimethylethylenediamine. The secondary amines do not necessarily have to contain two identical substituents. Examples of such mixed amines include N-methylethanolamine, N-methylallylamine and N-methylaniline. Additional secondary amines include those amines in which the amine nitrogen is contained within a heterocyclic ring. In some embodiments, the heterocyclic amines are six-membered ring heterocyclic amines. Examples of such heterocyclic amines include morpholine, piperidine, pyrrolidine, N-methylpiperazine, hexamethyleneimine, and thiomorpholine. In some embodiments, the heterocyclic amine may contain additional hetero atoms, for example, nitrogen, oxygen, or sulfur.

In some embodiments, the admixing in (a) is at a temperature between about 70° C. and about 130° C. In some embodiments, the admixing in (a) is at a temperature of about 100° C.

In some embodiments, the zinc source in (b) is a dialkyl zinc compound. In some embodiments, the zinc source in (b) is a zinc carboxylate. In some embodiments, the zinc source in (b) is diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source in (b) is zinc oleate, zinc hexanoate, zinc octanoate, zinc laurate, zinc myristate, zinc palmitate, zinc stearate, zinc dithiocarbamate, or mixtures thereof. In some embodiments, the zinc source in (b) is zinc oleate.

In some embodiments, the selenium source in (b) is selected from the group consisting of trioctylphosphine selenide, tri(n-butyl)phosphine selenide, tri(sec-butyl)phosphine selenide, tri(tert-butyl)phosphine selenide, trimethylphosphine selenide, triphenylphosphine selenide, diphenylphosphine selenide, phenylphosphine selenide, cyclohexylphosphine selenide, octaselenol, dodecaselenol, selenophenol, elemental selenium, hydrogen selenide, bis(trimethylsilyl) selenide, and mixtures thereof. In some embodiments, the selenium source in (b) is trioctylphosphine selenide.

In some embodiments, the admixing in (b) is at a temperature between about 250° C. and about 350° C. In some embodiments, the admixing in (b) is at a temperature of about 310° C.

In some embodiments, the second metal fluoride source in (c) is selected from the group consisting of $ZnF_2$, $HfF_4$, and $ZrF_4$. In some embodiments, the second metal fluoride source in (c) is $ZnF_2$. In some embodiments, the second metal fluoride source (c) is $HfF_4$. In some embodiments, the second metal fluoride source (c) is $ZrF_4$.

In some embodiments, the admixing in (c) further comprises a second amine source.

In some embodiments, the amine source is a lower alkyl amine, an alkenyl amine, a hydroalkyl amine, a haloalkyl amine, a primary aryl amine, a secondary aryl amine, or a heterocyclic amine. In some embodiments, the amine source is a secondary amine, i.e., amines having an amine group containing two C—N bonds and one N—H bond. In some embodiments, the amine source contains a total of 20 carbon atoms or less. In some embodiments, the amine source contains 10 carbon atoms or less. Examples of primary amines are alkylamines, such as ethylamine, butylamine, hexylamine, octylamine, decylamine, hexadecylamine, and octadecylamine; alkenylamines, such as allylamine, 2-hexenylamine, 4-decenylamine, and octadecenyl amines; alkanolamines, such as ethanolamine, octanolamine, and dodecanolamine; haloalkylamines, such as betachloroethylamine; and arylamines, such as aniline. Examples of secondary amines which may be used to prepare the compounds described herein include dialkylamines, such as diethylamine, di-n-propylamine, diisobutylamine, dihexylamine and dioctylamine; dialkenylamines, such as diallylamine and dihexenylamine; dialkanolamines, such as diethanolamine and didecanolamine; dihaloalkylamines, such as bis(betachloroethyl) amine; and N,N'-dialkylalkylenediamines, such as N,N-dimethylethylenediamine. The secondary amines do not necessarily have to contain two identical substituents. Examples of such mixed amines include N-methylethanolamine, N-methylallylamine and N-methylaniline. Additional secondary amines include those amines in which the amine nitrogen is contained within a heterocyclic ring. In some embodiments, the heterocyclic amines are six-membered ring heterocyclic amines. Examples of such heterocyclic amines include morpholine, piperidine, pyrrolidine, N-methylpiperazine, hexamethyleneimine, and thiomorpholine. In some embodiments, the heterocyclic amine may contain additional hetero atoms, for example, nitrogen, oxygen, or sulfur.

In some embodiments, the admixing in (c) is at a temperature between about 70° C. and about 130° C. In some embodiments, the admixing in (c) is at a temperature of about 100° C.

In some embodiments, the zinc source in (d) is a dialkyl zinc compound. In some embodiments, the zinc source in (d) is a zinc carboxylate. In some embodiments, the zinc source in (d) is diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source in (d) is zinc oleate, zinc hexanoate, zinc octanoate, zinc laurate, zinc myristate, zinc palmitate, zinc stearate, zinc dithiocarbamate, or mixtures thereof. In some embodiments, the zinc source in (d) is zinc oleate.

In some embodiments, the sulfur source in (d) is selected from the group consisting of trioctylphosphine sulfide, elemental sulfur, octanethiol, dodecanethiol, octadecanethiol, tributylphosphine sulfide, cyclohexyl isothiocyanate, α-toluenethiol, ethylene trithiocarbonate, allyl mercaptan, bis(trimethylsilyl) sulfide, trioctylphosphine sulfide, and combinations thereof. In some embodiments, the sulfur source in (d) is trioctylphosphine sulfide.

In some embodiments, the infusing in (d) is at a temperature between about 250° C. and about 350° C. In some embodiments, the infusing in (d) is at a temperature of about 310° C.

In some embodiments, the infusing in (d) is at an infusing rate between about 0.05 mL/min and about 5.0 mL/min. In some embodiments, the infusing in (d) is at an infusing rate of about 0.5 mL/min.

In some embodiments, the molar ratio of fluoride bound to the nanostructure to zinc in the nanostructure is between about 0.05 and about 0.35.

In some embodiments, the nanostructure is cooled to room temperature. In some embodiments, an organic solvent is added to dilute the reaction mixture comprising the nanostructure.

In some embodiments, the organic solvent used to dilute the reaction mixture is ethanol, hexane, pentane, toluene, benzene, diethylether, acetone, ethyl acetate, dichloromethane (methylene chloride), chloroform, dimethylformamide, or N-methylpyrrolidinone. In some embodiments, the organic solvent is toluene. In some embodiments, the organic solvent is a combination of toluene and ethanol.

In some embodiments, the nanostructure is isolated. In some embodiments, the nanostructure is isolated by precipitation using an organic solvent. In some embodiments, the nanostructure is isolated by flocculation with ethanol. In some embodiments, the nanostructures are further isolated by centrifugation followed by decanting of the organic solvent.

Amine Passivation

In some embodiments, the present disclosure provides a nanostructure comprising a core comprising a nanocrystal core; at least one shell disposed on the core, wherein at least one shell comprises ZnS and fluoride; and at least one amine bound to the nanostructure. In some embodiments, the present disclosure provides a nanostructure comprising a core comprising a nanocrystal core; at least one shell disposed on the core, wherein at least one shell comprises ZnS; at least one fluoride bound to the nanostructure; and at least one amine bound to the nanostructure.

The native ligand set (e.g., carboxylates and phosphines) of most quantum dots are not soluble in a wide range of organic media and are incompatible with matrix materials commonly used in the preparation of quantum dots films. Ligand exchange can be used to solve these problems but the exchange may influence surface trap states and hence, the photoluminescence quantum yield of the quantum dots. And, it has found that photoluminescence quantum yield and ligation are not simply related, not only because of their nonlinear independence, but also because metal carboxylates complexes can concurrently be displaced with amine binding.

Furthermore, quantum dots, especially InP quantum dots, are known to be sensitive to primary amines. This sensitivity limits the choice of matrix materials and/or ligands that can be used with InP quantum dots.

Figure 11:
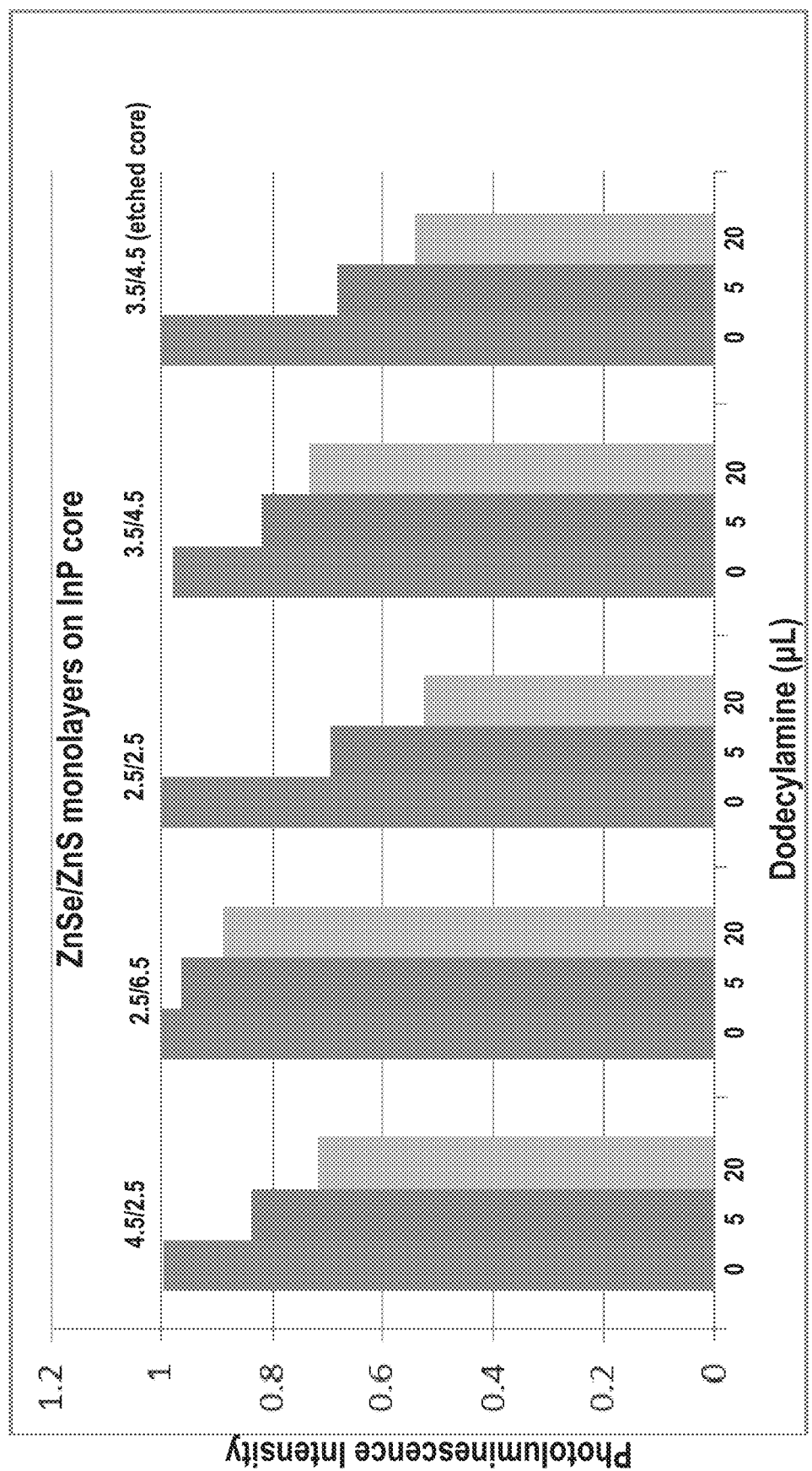
FIG. 11 are bar graphs showing the photoluminescence intensity for InP/ZnSe/ZnS quantum dots comprising 5 different ZnSe and ZnS shell thicknesses (4.5 monolayers of ZnSe and 2.5 monolayers of ZnS; 2.5 monolayers of ZnSe and 6.5 monolayers of ZnS; 2.5 monolayers of ZnSe and 2.5 monolayers of ZnS; 3.5 monolayers of ZnSe and 4.5 monolayers of ZnS; and 3.5 monolayers of ZnSe and 4.5 monolayers of ZnS (on an etched InP core)) after addition of dodecylamine at three different concentrations: 0 μL, 5 μL, and 20 μL.

Attempts to lower the relative extent of quenching of InP quantum dots have shown only moderate success. For example, it was found that the use of a thick inorganic shell coating on InP quantum dots can lower the extent of quantum yield quenching by amines. As shown in FIG. 11, the thickest shell coating comprising 2.5 monolayers of ZnSe and 6.5 monolayers of ZnS prevented a greater amount of quantum dot quenching by dodecylamine than the thinnest shell coating comprising 2.5 monolayers of ZnSe and 2.5 monolayers of ZnS. However, quantum dots with very thick shells may suffer from strain-induced interface traps which may ultimately cause a lower absolute quantum yield.

Figure 12:
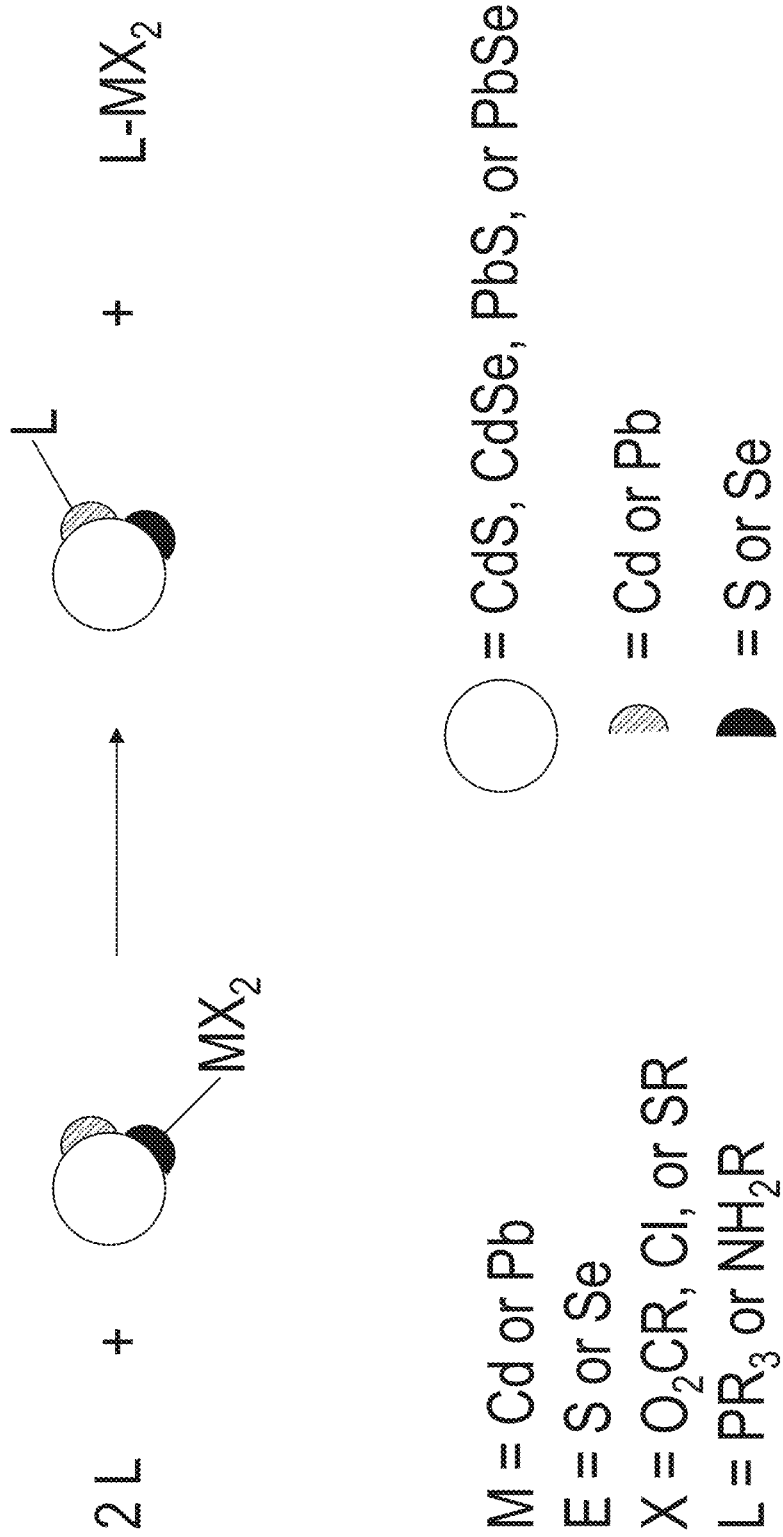
FIG. 12 is a schematic showing L-promoted Z-type ligand displacement where a neutral Lewis base ligand (L), such as an amine, readily displaces a metal carboxylate ($MX_2$, where M is Cd or Pb; X is $O_2CR$, Cl, or SR; and R is $C_{1-20}$ alkyl or oleyl) from carboxylate-terminated CdS, CdSe, PbS, or PbSe quantum dots.

Studies on the coordination chemistry of carboxylate-terminated CdSe, CdS, PbSe, and PbS quantum dots provide an explanation of the quenching mechanism (Anderson, N. C., et al., *J. Am. Chem. Soc.* 135:18536-18548 (2013)). As shown in FIG. 12, a neutral Lewis base ligand (L), such as an amine, readily displace a metal carboxylate ($MX_2$, wherein M is Cd or Pb; and X is $O_2CR$, Cl, or SR) from carboxylate-terminated CdSe, CdS, PbS, or PbS quantum dots. Amine molecules coordinate to the metal carboxylate and to metal sites on the quantum dot surfaces. The resultant amine-metal complex is highly soluble and thus, is easily removed from the quantum dot surface.

Amines can bind to the surface of metal sites. Model studies have shown that amines prevent reduction of $Cd^{2+}$ to Cd—Cd dimers on negatively charged CdTe quantum dots (du Fossé, I., et al., *Chem. Mater.* 31:4575-4583 (2019)). For example, it is believed that the binding of amines to the surface of quantum dots comprising fluoride ligands is facilitated by the low space demand of a fluoride ligand, such as zinc fluoride, compared to a native ligand, such as zinc oleate. Therefore, fluoride ligands and amines can coexist on the quantum dot surface and passivate both hole and electron traps.

In some embodiments, the amine bound to the surface of the nanostructure is a lower alkyl amine, an alkenyl amine, a hydroalkyl amine, a haloalkyl amine, a primary aryl amine, a secondary aryl amine, or a heterocyclic amine. In some embodiments, the amine bound to the surface of the nanostructure is a secondary amine, i.e., amines having an amine group containing two C—N bonds and one N—H bond. In some embodiments, the amine bound to the surface of the nanostructure contains a total of 20 carbon atoms or less. In some embodiments, the amine bound to the surface of the nanostructure contains 10 carbon atoms or less. Examples of primary amines are alkylamines, such as ethylamine, butylamine, hexylamine, octylamine, decylamine, hexadecylamine, and octadecylamine; alkenylamines, such as allylamine, 2-hexenylamine, 4-decenylamine, and octadecenyl amines; alkanolamines, such as ethanolamine, octanolamine, and dodecanolamine; haloalkylamines, such as betachloroethylamine; and arylamines, such as aniline. Examples of secondary amines which can bind to the surface of the nanostructures described herein include dialkylamines, such as diethylamine, di-n-propylamine, diisobutylamine, dihexylamine and dioctylamine; dialkenylamines, such as diallylamine and dihexenylamine; dialkanolamines, such as diethanolamine and didecanolamine; dihaloalkylamines, such as bis(beta-chloroethyl) amine; and N,N'-dialkylalkylenediamines, such as N,N-dimethylethylenediamine. The secondary amines do not necessarily have to contain two identical substituents. Examples of such mixed amines include N-methylethanolamine, N-methylallylamine and N-methylaniline. Additional secondary amines include those amines in which the amine nitrogen is contained within a heterocyclic ring. In some embodiments, the heterocyclic amines are six-membered ring heterocyclic amines. Examples of such heterocyclic amines include morpholine, piperidine, pyrrolidine, N-methylpiperazine, hexamethyleneimine, and thiomorpholine. In some embodiments, the heterocyclic amine may contain additional hetero atoms, for example, nitrogen, oxygen, or sulfur.

First Ligands

In some embodiments, the nanostructures comprise ligands bound to their surface. In some embodiments, the nanostructures include a coating layer comprising ligands to protect the nanostructures from external moisture and oxidation, to control aggregation, and to allow for dispersion of the nanostructures in the matrix material. Suitable first ligands include those disclosed in U.S. Pat. Nos. 6,949,206; 7,267,875; 7,374,807; 7,572,393; 7,645,397; and 8,563,133 and in U.S. Patent Appl. Publication Nos. 2008/0237540; 2008/0281010; and 2010/0110728, which are incorporated herein by reference in their entireties.

In some embodiments, the nanostructure comprises a multi-part ligand structure, such as the three-part ligand structure disclosed in U.S. Patent Appl. Publication No. 2008/237540, in which the head-group, tail-group, and middle/body group are independently fabricated and optimized for their particular function, and then combined into an ideally functioning complete surface ligand.

In some embodiments, the first ligands comprise one or more organic polymeric ligands. Suitable ligands provide: efficient and strong bonding quantum dot encapsulation with low oxygen permeability; precipitate or segregate into domain in the matrix material to form a discontinuous dual-phase or multi-phase matrix; disperse favorably throughout the matrix material; and are commercially available materials or can be easily formulated from commercially available materials.

In some embodiments, the first ligand comprises a carboxy, a thiol, a phosphine, or a phosphine oxide group.

In some embodiments, the first ligand comprises a carboxy group. In some embodiments, the first ligand comprises a carboxylic acid group. In some embodiments, the first ligand comprises a carboxylic acid group and the carboxylic acid is a caprylic acid, capric acid, lauric acid, myristic acid, or palmitic acid. In some embodiments, the first ligand is a carboxylate. In some embodiments, the first ligand comprises a carboxylate and the carboxylate is a carboxyalkyl.

In some embodiments, the first ligand comprises a metal carboxylate. In some embodiments, the first ligand is a metal carboxylate selected from the group consisting of zinc oleate, zinc hexanoate, zinc laurate, zinc myristate, zinc palmitate, zinc stearate, and zinc PEG-carboxylate. In some embodiments, the first ligand is a metal carboxylate selected from the group consisting of zinc oleate, zinc laurate, and zinc PEG-carboxylate. In some embodiments, the first ligand is zinc oleate.

In some embodiments, the first ligand comprises a phosphine group. In some embodiments, the first ligand comprises a phosphine group and the phosphine group is triphenylphosphine, tributylphosphine, trihexylphosphine, trioctylphosphine (TOP), or tridecylphosphine.

In some embodiments, the first ligand comprises a phosphine oxide group. In some embodiments, the first ligand comprises a phosphine oxide group and the phosphine oxide is triphenylphosphine oxide, tributylphosphine oxide, trihexylphosphine oxide, trioctylphosphine oxide (TOPO), or tridecylphosphine oxide.

Ligand Exchange

In some embodiments, the present invention is directed to a method for exchanging ligands on nanostructures. In some embodiments, a first ligand on a nanostructure is exchanged with at least one fluoride ligand. During the ligand exchange, at least one functional group of the fluoride ligand displaces the native hydrophobic ligands of the nanostructure and affords a stable anchoring of the ligand onto the nanocrystal surface. In some embodiments, the nanostructure is a quantum dot.

In some embodiments, the first ligand is bound covalently to the nanostructure. In some embodiments, the first ligand is bound non-covalently to the nanostructure.

In some embodiments, the present disclosure is directed to a method of replacing a first ligand on a nanostructure with a second ligand comprising:

admixing a reaction mixture comprising a population of nanostructures having the first ligand bound to the nanostructure and at least one fluoride ligand which is the second ligand, such that the second ligand displaces the first ligand and becomes bound to the nanostructure.

In some embodiments, the fluoride ligand is selected from a metal fluoride, an ammonium fluoride, or a tetraalkylammonium fluoride.

In some embodiments, the fluoride ligand is a metal fluoride selected from the group consisting of $ZnF_2$, $HfF_4$, and $ZrF_4$. In some embodiments, the metal fluoride is $ZnF_2$. In some embodiments, the metal fluoride is $HfF_4$. In some embodiments, the metal fluoride is $ZrF_4$.

In some embodiments, the fluoride ligand is a tetraalkylammonium fluoride selected from the group consisting of tetrabutylammonium fluoride, tetrapropylammonium fluoride, diisopropyldimethylammonium fluoride, tetraethylammonium fluoride, and tetramethylammonium fluoride, dioctadecyldimethylammonium fluoride, dihexadecyldimethylammonium fluoride, ditetradecyldimethylammonium fluoride, didodecyldimethylammonium fluoride, didecyldimethylammonium fluoride, dioctyldimethylammonium fluoride, bis(ethylhexyl)dimethylammonium fluoride, octadecyltrimethylammonium fluoride, oleyltrimethylammonium fluoride, hexadecyltrimethylammonium fluoride, tetradecyltrimethylammonium fluoride, dodecyltrimethylammonium fluoride, decyltrimethylammonium fluoride, octyltrimethylammonium fluoride, phenylethyltrimethylammonium fluoride, benzyltrimethylammonium fluoride, phenyltrimethylammonium fluoride, benzylhexadecyldimethylammonium fluoride, benzyltetradecyldimethylammonium fluoride, benzyldodecyldimethylammonium fluoride, benzyldecyldimethylammonium fluoride, benzyloctyldimethylammonium fluoride, benzyltributylammonium fluoride, and benzyltriethylammonium fluoride.

In some embodiments, the tetraalkylammonium fluoride is tetrabutylammonium fluoride.

In some embodiments, the fluoride ligand is tetrabutylammonium fluoride.

In some embodiments, the nanostructure is a quantum dot.

In some embodiments, the second ligand becomes covalently bound to the nanostructure. In some embodiments, the second ligand becomes non-covalently bound to the nanostructure.

In some embodiments, the admixing is performed at a temperature between about 0° C. and about 200° C., about 0° C. and about 150° C., about 0° C. and about 100° C., about 0° C. and about 80° C., about 20° C. and about 200° C., about 20° C. and about 150° C., about 20° C. and about 100° C., about 20° C. and about 80° C., about 50° C. and about 200° C., about 50° C. and about 150° C., about 50° C. and about 100° C., about 50° C. and about 80° C., about 80° C. and about 200° C. about 80° C. and about 150° C., about 80° C. and about 100° C., about 100° C. and about 200° C., about 100° C. and about 150° C., or about 150° C. and about 200° C. In some embodiments, the admixing is performed at a temperature between about 50° C. and about 100° C. In some embodiments, the admixing is performed at a temperature of about 70° C.

In some embodiments, the admixing is performed over a period of about 1 minute and about 6 hours, about 1 minute and about 2 hours, about 1 minute and about 1 hour, about 1 minute and about 40 minutes, about 1 minute and about 30 minutes, about 1 minute and about 20 minutes, about 1 minute and about 10 minutes, about 10 minutes and about 6 hours, about 10 minutes and about 2 hours, about 10 minutes and about 1 hour, about 10 minutes and about 40 minutes, about 10 minutes and about 30 minutes, about 10 minutes and about 20 minutes, about 20 minutes and about 6 hours, about 20 minutes and about 2 hours, about 20 minutes and about 1 hour, about 20 minutes and about 40 minutes, about 20 minutes and about 30 minutes, about 30 minutes and about 6 hours, about 30 minutes and about 2 hours, about 30 minutes and about 1 hour, about 30 minutes and about 40 minutes, about 40 minutes and about 6 hours, about 40 minutes and about 2 hours, about 40 minutes and about 1 hour, about 1 hour and about 6 hours, about 1 hour and about 2 hours, or about 2 hours and about 6 hours. In some embodiments, the admixing is performed over a period of about 40 minutes and about 2 hours. In some embodiments, the admixing is performed over a period of about 1 hour.

In some embodiments, the reaction mixture further comprises a solvent. In some embodiments, the solvent is selected from the group consisting of chloroform, acetone, butanone, tetrahydrofuran, 2-methyltetrahydrofuran, ethylene glycol monoethyl ether, ethylene glycol monopropyl ether, ethylene glycol monobutyl ether, diethylene glycol diethyl ether, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof. In some embodiments, the solvent is toluene.

The percentage of first ligands displaced by fluoride ligands can be measured by $^{19}F$ NMR or Fourier-transform infrared spectroscopy (FTIR). In some embodiments, the mole percentage of first ligands displaced by the fluoride ligands is between about 20% and about 100%, about 20% and about 80%, about 20% and about 60%, about 20% and about 40%, about 25% and about 100%, about 25% and about 80%, about 25% and about 60%, about 25% and about 40%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

The percentage of fluoride ligands that are bound to a nanostructure in a population of nanostructures can be measured by $^{19}F$ NMR, wherein the bound ligands are calculated using: (bound fluoride ligands)/(bound+free fluoride ligands).

In some embodiments, the mole percentage of fluoride ligands bound to a nanostructures is between about 20% and about 100% is between about 20% and about 100%, about 20% and about 80%, about 20% and about 60%, about 20% and about 40%, about 25% and about 100%, about 25% and about 80%, about 25% and about 60%, about 25% and about 40%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

Production of Nanostructures With Fluoride Ligands and Amines

In some embodiments, the present disclosure provides a method of preparing a nanostructure, comprising admixing:

(a) a nanostructure comprising a nanocrystal core and at least one shell disposed on the core, wherein at least one shell comprises ZnS or ZnSe; and
(b) at least one fluoride source; and
(c) at least one amine source;
to provide a nanostructure.

In some embodiments, the molar ratio of the fluoride source to the nanostructure is between about 0.5:1 and about 10:1, about 0.5:1 and about 9:1, about 0.5:1 and 8:1, about 0.5:1 and about 7:1, about 0.5:1 and about 6:1, about 0.5:1 and about 5:1, about 0.5:1 and about 4:1, about 0.5:1 and about 3:1, about 0.5:1 and about 2:1, or about 0.5:1 and about 1:1. In some embodiments, the molar ratio of the fluoride source to the nanostructure is about 0.5:1, about 1:1, about 2:1, about 3:1, about 4:1, about 5:1, about 6:1, about 7:1, about 8:1, about 9:1, or about 10:1.

In some embodiments, the nanostructure in (a) is InP/ZnSe/ZnS. In some embodiments, the nanostructure in (a) is red-emitting InP/ZnSe/ZnS. In some embodiments, the nanostructure in (a) is green-emitting InP/ZnSe/ZnS.

In some embodiments, the fluoride source in (b) is selected from the group consisting of tetraalkylammonium fluoride, $ZnF_2$, $HfF_4$, and $ZrF_4$. In some embodiments, the fluoride source in (b) is $ZnF_2$. In some embodiments, the fluoride source in (b) is $HfF_4$. In some embodiments, the fluoride source in (b) is $ZrF_4$. In some embodiments, the fluoride source in (b) is a tetraalkylammonium fluoride.

In some embodiments, the amine source in (c) is a lower alkyl amine, an alkenyl amine, a hydroalkyl amine, a haloalkyl amine, a primary aryl amine, a secondary aryl amine, or a heterocyclic amine. In some embodiments, the amine source in (c) is a secondary amine, i.e., amines having an amine group containing two C—N bonds and one N—H bond. In some embodiments, the amine source in (c) contains a total of 20 carbon atoms or less. In some embodiments, the amine source in (c) contains 10 carbon atoms or less. Examples of primary amines are alkylamines, such as ethylamine, butylamine, hexylamine, octylamine, decylamine, hexadecylamine, and octadecylamine; alkenylamines, such as allylamine, 2-hexenylamine, 4-decenylamine, and octadecenyl amines; alkanolamines, such as ethanolamine, octanolamine, and dodecanolamine; haloalkylamines, such as betachloroethylamine; and arylamines, such as aniline. Examples of secondary amines which may be used to prepare the compounds described herein include dialkylamines, such as diethylamine, di-n-propylamine, diisobutylamine, dihexylamine and dioctylamine; dialkenylamines, such as diallylamine and dihexenylamine; dialkanolamines, such as diethanolamine and didecanolamine; dihaloalkylamines, such as bis(beta-chloroethyl) amine; and N,N'-dialkylalkylenediamines, such as N,N-dimethylethylenediamine. The secondary amines do not necessarily have to contain two identical substituents. Examples of such mixed amines include N-methylethanolamine, N-methylallylamine and N-methylaniline. Additional secondary amines include those amines in which the amine nitrogen is contained within a heterocyclic ring. In some embodiments, the heterocyclic amines are six-membered ring heterocyclic amines. Examples of such heterocyclic amines include morpholine, piperidine, pyrrolidine, N-methylpiperazine, hexamethyleneimine, and thiomorpholine. In some embodiments, the heterocyclic amine may contain additional hetero atoms, for example, nitrogen, oxygen, or sulfur. In some embodiments, the amine source is octylamine.

In some embodiments, the admixing is at a temperature between about 50° C. and about 130° C. In some embodiments, the admixing is at a temperature between about 50° C. and about 130°, about 50° C. and about 100° C., about 50° C. and about 70° C., about 70° C. and about 130° C., about 70° C. and about 100° C., or about 100° C. and about 130° C. In some embodiments, the admixing is at a temperature of about 70° C.

In some embodiments, the molar ratio of fluoride bound to the nanostructure is between about 0.05 and about 0.35.

In some embodiments, the nanostructure is cooled to room temperature. In some embodiments, an organic solvent is added to dilute the reaction mixture comprising the nanostructure.

In some embodiments, the organic solvent used to dilute the reaction mixture is ethanol, hexane, pentane, toluene, benzene, diethylether, acetone, ethyl acetate, dichloromethane (methylene chloride), chloroform, dimethylformamide, or N-methylpyrrolidinone. In some embodiments, the organic solvent is toluene. In some embodiments, the organic solvent is a combination of toluene and ethanol.

In some embodiments, the nanostructure is isolated. In some embodiments, the nanostructure is isolated by precipitation using an organic solvent. In some embodiments, the nanostructure is isolated by flocculation with ethanol. In some embodiments, the nanostructures are further isolated by centrifugation followed by decanting of the organic solvent.

Improved Properties of Nanostructures

In some embodiments, the core/shell(s) nanostructures prepared using the methods described herein display high photoluminescence quantum yield. In some embodiments, the core/shell(s) nanostructures can have a photoluminescence quantum yield of between 60% and 100%, between 60% and 95%, between 60% and 90%, between 60% and 85%, between 60% and 80%, between 60% and 70%, between 70% and 100%, between 70% and 95%, between 70% and 90%, between 70% and 85%, between 70% and 80%, between 80% and 100%, between 80% and 95%, between 80% to 90%, between 80% and 85%, between 85% and 100%, between 85% and 95%, between 80% and 85%, between 85% and 100%, between 85% and 90%, between 90% and 100%, between 90% and 95%, or between 95% and 100%. In some embodiments, the core/shell(s) nanostructures prepared using the methods described herein have a photoluminescence quantum yield of between 60% and 99%. In some embodiments, the core/shell(s) nanostructures prepared using the methods described herein have a photoluminescence quantum yield of between 70% and 99%.

The photoluminescence spectrum of the core/shell(s) nanostructures prepared using the methods described herein can cover essentially any desired portion of the spectrum. In some embodiments, the photoluminescence spectrum for the core/shell(s) nanostructures have peak emission wavelength (PWL) between 300 nm and 750 nm, between 300 nm and 650 nm, between 300 nm and 550 nm, between 300 nm and 450 nm, between 450 nm and 750 nm, between 450 nm and 650 nm, between 450 nm and 550 nm, between 450 nm and 750 nm, between 450 nm and 650 nm, between 450 nm and 550 nm, between 550 nm and 750 nm, between 550 nm and 650 nm, or between 650 nm and 750 nm. In some embodiments, the photoluminescence spectrum for the core/shell(s) nanostructures have PWL of between 400 nm and 500 nm.

The size distribution of the core/shell(s) nanostructures prepared using the methods described herein can be relatively narrow. In some embodiments, the photoluminescence spectrum of the population or core/shell(s) nanostructures prepared using the methods described herein have a full width at half maximum of between 10 nm and 60 nm, between 10 nm and 40 nm, between 10 nm and 30 nm, between 10 nm and 20 nm, between 20 nm and 60 nm, between 20 nm and 40 nm, between 20 nm and 30 nm, between 30 nm and 60 nm, between 30 nm and 40 nm, or between 40 nm and 60 nm. In some embodiments, the photoluminescence spectrum of the population or core/shell(s) nanostructures prepared using the methods described herein have a full width at half maximum of between 10 nm and 40 nm. In some embodiments, the photoluminescence spectrum of the population of core/shell(s) nanostructures prepared using the methods described herein have a full width at half maximum of between 30 nm and 45 nm.

Nanostructure Film

In some embodiments, the core/shell(s) nanostructures prepared by the method described herein are incorporated into a nanostructure film. In some embodiments, the nanostructure film is incorporated into a quantum dot enhancement film (QDEF).

In some embodiments, the present disclosure provides a nanostructure film comprising:
  (a) at least one population of nanostructures, the nanostructures comprising a core comprising a nanocrystal core; and at least one shell disposed on the core, wherein at least one shell comprises ZnS and fluoride; and
  (b) at least one organic resin.

In some embodiments, the present disclosure provides a nanostructure film comprising:
  (a) at least one population of nanostructures, the nanostructures comprising a core comprising a nanocrystal core; and at least one shell disposed on the core, wherein at least one shell comprises ZnS; at least one fluoride bound to the surface of the nanostructures; and at least one amine bound to the surface of the nanostructures; and
  (b) at least one organic resin.

In some embodiments, the nanostructure is a quantum dot.

In some embodiments, the present disclosure provides a nanostructure film comprising:
  (a) at least one population of nanostructures, the nanostructures comprising a core comprising ZnSe or $ZnSe_{1-x}Te_x$, wherein $0 \leq x < 1$, and a first metal fluoride; and at least one shell disposed on the core, wherein at least one shell comprises ZnS and optionally a second metal fluoride; and
  (b) at least one organic resin.

In some embodiments, the present disclosure provides a nanostructure film comprising:
  (a) at least one population of nanostructures, the nanostructures comprising a core comprising InP; and at least one shell disposed on the core, wherein at least one shell comprises ZnS or ZnSe; at least one fluoride bound to the surface of the nanostructure; and at least one amine bound to the surface of the nanostructure; and
  (b) at least one organic resin.

In some embodiments, the nanostructure is a quantum dot.

In some embodiments, the core/shell(s) nanostructures are embedded in a matrix. As used herein, the term "embedded" is used to indicate that the nanostructures are enclosed or encased within a matrix material that makes up the majority component of the matrix. In some embodiments, the nanostructures are uniformly distributed throughout the matrix material. In some embodiments, the nanostructures are distributed according to an application-specific uniformity distribution function.

In some embodiments, the nanostructures can include a homogenous population having sizes that emit in the blue visible wavelength spectrum, in the green visible wavelength spectrum, or in the red visible wavelength spectrum. In some embodiments, the nanostructures can include a first population of nanostructures having sizes that emit in the blue visible wavelength spectrum, a second population of nanostructures having sizes that emit in the green visible wavelength spectrum, and a third population of nanostructures having sizes that emit in the red visible wavelength spectrum.

The matrix material can be any suitable host matrix material capable of housing nanostructures. Suitable matrix materials can be chemically and optically compatible with nanostructures and any surrounding packaging materials or layers used in applying a nanostructure film to devices. Suitable matrix materials can include non-yellowing optical materials that are transparent to both the primary and secondary light, thereby allowing for both primary and secondary light to transmit through the matrix material. Matrix materials can include polymers and organic and inorganic oxides. Suitable polymers for use in the matrix material can be any polymer known to the ordinarily skilled artisan that can be used for such a purpose. The polymer can be substantially translucent or substantially transparent. Matrix materials can include, but not limited to, epoxies, acrylates, norbornene, polyethylene, poly(vinyl butyral): poly(vinyl acetate), polyurea, polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are cross-linked with bifunctional monomers, such as divinylbenzene; cross-linkers suitable for cross-linking ligand materials, epoxides that combine with ligand amines (e.g., APS or polyethylene imine ligand amines) to form epoxy, and the like.

In some embodiments, the matrix material includes scattering microbeads such as $TiO_2$ microbeads, ZnS microbeads, or glass microbeads that can improve photo conversion efficiency of the nanostructure film. In some embodiments, the matrix material can include light blocking elements.

In some embodiments, the matrix material can have low oxygen and moisture permeability, exhibit high photo- and chemical-stability, exhibit favorable refractive indices, and adhere to outer surfaces of the nanostructures, thus providing an air-tight seal to protect the nanostructures. In another embodiment, the matrix material can be curable with UV or thermal curing methods to facilitate roll-to-roll processing.

In some embodiments, a nanostructure film can be formed by mixing nanostructures in a polymer (e.g., photoresist) and casting the nanostructure-polymer mixture on a substrate, mixing the nanostructures with monomers and polymerizing them together, mixing nanostructures in a sol-gel to form an oxide, or any other method known to those skilled in the art.

In some embodiments, the formation of a nanostructure film can include a film extrusion process. The film extrusion process can include forming a homogenous mixture of matrix material and barrier layer coated core-shell nanostructures such as nanostructures functionalized with a metal halide and/or a metal carboxylate, introducing the homogenous mixture into a top mounted hopper that feeds into an extruder. In some embodiments, the homogenous mixture can be in the form of pellets. The film extrusion process can further include extruding a nanostructure film from a slot die and passing an extruded nanostructure film through chill rolls. In some embodiments, the extruded nanostructure film can have a thickness less than about 75 μm, for example, in a range from about 70 μm to about 40 μm, about 65 μm to about 40 μm, about 60 μm to about 40 μm, or about 50 μm to about 40 μm. In some embodiments, the nanostructure film has a thickness less than about 10 μm. In some embodiments, the formation of the nanostructure film can optionally include a secondary process followed by the film extrusion process. The secondary process can include a process such as co-extrusion, thermoforming, vacuum forming, plasma treatment, molding, and/or embossing to provide a texture to a top surface of the nanostructure film layer. The textured top surface nanostructure film can help to improve, for example defined optical diffusion property and/or defined angular optical emission property of the nanostructure film.

Nanostructure Molded Article

In some embodiments, the nanostructure composition is used to form a nanostructure molded article. In some embodiments, the nanostructure molded article is a liquid crystal display (LCD) or a light emitting diode (LED). In some embodiments, the nanostructure composition is used to form the emitting layer of an illumination device. The illumination device can be used in a wide variety of applications, such as flexible electronics, touchscreens, monitors, televisions, cellphones, and any other high definition displays. In some embodiments, the illumination device is a light emitting diode or a liquid crystal display. In some embodiments, the illumination device is a quantum dot light emitting diode (QLED). An example of a QLED is disclosed in U.S. patent application Ser. No. 15/824,701, which is incorporated herein by reference in its entirety.

In some embodiments, the present disclosure provides a light emitting diode comprising:
(a) a first conductive layer;
(b) a second conductive layer; and
(c) an emitting layer between the first barrier layer and the second barrier layer, wherein the emitting layer comprises a population of nanostructures comprising a core comprising a nanocrystal core; and at least one shell disposed on the core, wherein at least one shell comprises ZnS and fluoride.

In some embodiments, the present disclosure provides a light emitting diode comprising:
(a) a first conductive layer;
(b) a second conductive layer; and
(c) an emitting layer between the first barrier layer and the second barrier layer, wherein the emitting layer comprises a population of nanostructures comprising a core comprising a nanocrystal core; and at least one shell disposed on the core, wherein at least one shell comprises ZnS or ZnSe; at least one fluoride bound to the surface of the nanostructures; and at least one amine bound to the surface of the nanostructures.

In some embodiments, the present disclosure provides a light emitting diode comprising:
(a) a first barrier layer;
(b) a second barrier layer; and
(c) an emitting layer between the first barrier layer and the second barrier layer, wherein the emitting layer comprises a population of nanostructures comprising a core comprising ZnSe or $ZnSe_{1-x}Te_x$, wherein $0 \leq x < 1$, and a first metal fluoride; and at least one shell disposed on the core, wherein at least one shell comprises ZnS and optionally a second metal fluoride.

In some embodiments, the present disclosure provides a light emitting diode comprising:
(a) a first barrier layer;
(b) a second barrier layer; and
(c) an emitting layer between the first barrier layer and the second barrier layer, wherein the emitting layer comprises a population of nanostructures comprising a core comprising InP; and at least one shell disposed on the core, wherein at least one shell comprises ZnS or ZnSe; at least one fluoride bound to the surface of the nanostructures; and at least one amine bound to the surface of the nanostructures.

In some embodiments, the emitting layer is a nanostructure film.

In some embodiments, the light emitting diode comprises a first conductive layer, a second conductive layer, and an emitting layer, wherein the emitting layer is arranged between the first conductive layer and the second conductive layer. In some embodiments, the emitting layer is a thin film.

In some embodiments, the light emitting diode comprises additional layers between the first conductive layer and the second conductive layer such as a hole injection layer, a hole transport layer, and an electron transport layer. In some embodiments, the hole injection layer, the hole transport layer, and the electron transport layer are thin films. In some embodiments, the layers are stacked on a substrate.

When voltage is applied to the first conductive layer and the second conductive layer, holes injected at the first conductive layer move to the emitting layer via the hole injection layer and/or the hole transport layer, and electrons injected from the second conductive layer move to the emitting layer via the electron transport layer. The holes and electrons recombine in the emitting layer to generate excitons.

Quantum Dot on Glass LCD Display Device

In some embodiments, the nanostructure film is incorporated into a quantum dot on glass LCD display device. A LCD display device can include a nanostructure film formed directly on a light guide plate (LGP) without necessitating an intermediate substrate or barrier layer. In some embodiments, a nanostructure film can be a thin film. In some embodiments, a nanostructure film can have a thickness of 500 μm or less, 100 μm or less, or 50 μm or less. In some embodiments, a nanostructure film is a thin film having a thickness of about 15 μm or less.

A LGP can include an optical cavity having one or more sides, including at least a top side, comprising glass. Glass provides excellent resistance to impurities including moisture and air. Moreover, glass can be formed as a thin substrate while maintaining structural rigidity. Therefore, a LGP can be formed at least partially of a glass surface to provide a substrate having sufficient barrier and structural properties.

In some embodiments, a nanostructure film can be formed on a LGP. In some embodiments, the nanostructure film comprises a population of nanostructures embedded in a matrix material, such as a resin. A nanostructure film can be formed on a LGP by any method known in the art, such as wet coating, painting, spin coating, or screen printing. After deposition, a resin of a nanostructure film can be cured. In some embodiments a resin of one or more nanostructure films can be partially cured, further processed and then finally cured. The nanostructure films can be deposited as one layer or as separate layers, and the separate layers can comprise varying properties. The width and height of the nanostructure films can be any desired dimensions, depending on the size of the viewing panel of the display device. For example, the nanostructure films can have a relatively small surface area in small display device embodiments such as watches and phones, or the nanostructure films can have a large surface area for large display device embodiments such as TVs and computer monitors.

In some embodiments, an optically transparent substrate is formed on a nanostructure film by any method known in the art, such as vacuum deposition, vapor deposition, or the like. An optically transparent substrate can be configured to provide environmental sealing to the underlying layers and/or structures of the nanostructure film. In some embodiments, light blocking elements can be included in the optically transparent substrate. In some embodiments, light blocking elements can be included in a second polarizing filter, which can be positioned between the substrate and the nanostructure film. In some embodiments, light blocking elements can be dichroic filters that, for example, can reflect the primary light (e.g., blue light, UV light, or combination of UV light and blue light) while transmitting the secondary light. Light blocking elements can include specific UV light filtering components to remove any unconverted UV light from the red and green sub-pixels, and/or the UV light from the blue sub-pixels.

On-Chip and Near Chip Placement of Quantum Dots

In some embodiments, the nanostructures are incorporated into display devices by "on-chip" placements. As used herein, "on-chip" refers to placing nanostructures into an LED cup. In some embodiments, the nanostructures are dissolved in a resin or a fluid to fill the LED cup.

In some embodiments, the nanostructures are incorporated into display devices by "near-chip" placements. As used herein, "near-chip" refers to coating the top surface of the LED assembly with nanostructures such that the outgoing light passes through the nanostructure film.

Display Device with Nanostructure Color Conversion Layer

In some embodiments, the present invention provides a display device comprising:
(a) a display panel to emit a first light;
(b) a backlight unit configured to provide the first light to the display panel; and
(c) a color filter comprising at least one pixel region comprising a color conversion layer.

In some embodiments, the color filter comprises at least 1, 2, 3, 4, 5, 6, 7, 8, 9, or 10 pixel regions. In some embodiments, when blue light is incident on the color filter, red light, white light, green light, and/or blue light may be respectively emitted through the pixel regions. In some embodiments, the color filter is described in U.S. Patent Appl. Publication No. 2017/153366, which is incorporated herein by reference in its entirety.

In some embodiments, each pixel region includes a color conversion layer. In some embodiments, a color conversion layer comprises nanostructures described herein configured to convert incident light into light of a first color. In some embodiments, the color conversion layer comprises nanostructures described herein configured to convert incident light into blue light.

In some embodiments, the display device comprises 1, 2, 3, 4, 5, 6, 7, 8, 9, or 10 color conversion layers. In some embodiments, the display device comprises 1 color conversion layer comprising the nanostructures described herein. In some embodiments, the display device comprises 2 color conversion layers comprising the nanostructures described herein. In some embodiments, the display device comprises 3 color conversion layers comprising the nanostructures described herein. In some embodiments, the display device comprises 4 color conversion layers comprising the nanostructures described herein. In some embodiments, the display device comprises at least one red color conversion layer, at least one green color conversion layer, and at least one blue color conversion layer.

In some embodiments, the color conversion layer has a thickness between about 3 µm and about 10 µm, about 3 µm and about 8 µm, about 3 µm and about 6 µm, about 6 µm and about 10 µm, about 6 µm and about 8 µm, or about 8 µm and about 10 µm. In some embodiments, the color conversion layer has a thickness between about 3 µm and about 10 µm.

The nanostructure color conversion layer can be deposited by any suitable method known in the art, including but not limited to painting, spray coating, solvent spraying, wet coating, adhesive coating, spin coating, tape-coating, roll coating, flow coating, inkjet printing, photoresist patterning, drop casting, blade coating, mist deposition, or a combination thereof. In some embodiments, the nanostructure color conversion layer is deposited by photoresist patterning. In some embodiments, nanostructure color conversion layer is deposited by inkjet printing.

Inkjet Printing

The formation of thin films using dispersions of nanostructures in organic solvents is often achieved by coating techniques such as spin coating. However, these coating techniques are generally not suitable for the formation of thin films over a large area and do not provide a means to pattern the deposited layer and thus, are of limited use. Inkjet printing allows for precisely patterned placement of thin films on a large scale at low cost. Inkjet printing also allows for precise patterning of nanostructure layers, allows printing pixels of a display, and eliminates photopatterning. Thus, inkjet printing is very attractive for industrial application—particularly in display applications.

Solvents commonly used for inkjet printing are dipropylene glycol monomethyl ether acetate (DPMA), polyglycidyl methacrylate (PGMA), diethylene glycol monoethyl ether acetate (EDGAC), and propylene glycol methyl ether acetate (PGMEA). Volatile solvents are also frequently used in inkjet printing because they allow rapid drying. Volatile solvents include ethanol, methanol, 1-propanol, 2-propanol, acetone, methyl ethyl ketone, methyl isobutyl ketone, ethyl acetate, and tetrahydrofuran. Conventional nanostructures generally cannot be dissolved in these solvents. However, the increased hydrophilicity of the nanostructures comprising poly(alkylene oxide) ligands allows for increased solubility in these solvents.

In some embodiments, the nanostructures described herein used for inkjet printing are dispersed in a solvent selected from DPMA, PGMA, EDGAC, PGMEA, ethanol, methanol, 1-propanol, 2-propanol, acetone, methyl ethyl ketone, methyl isobutyl ketone, ethyl acetate, tetrahydrofuran, chloroform, chlorobenzene, cyclohexane, hexane, heptane, octane, hexadecane, undecane, decane, dodecane, xylene, toluene, benzene, octadecane, tetradecane, butyl ether, or combinations thereof. In some embodiments, the nanostructures comprising a poly(alkylene oxide) ligands described herein used for inkjet printing are dispersed in a solvent selected from DPMA, PGMA, EDGAC, PGMEA, ethanol, methanol, 1-propanol, 2-propanol, acetone, methyl ethyl ketone, methyl isobutyl ketone, ethyl acetate, tetrahydrofuran, or combinations thereof.

In order to be applied by inkjet printing or microdispensing, the inkjet compositions comprising nanostructures should be dissolved in a suitable solvent. The solvent must be able to disperse the nanostructure composition and must not have any detrimental effect on the chosen print head.

In some embodiments, the inkjet composition further comprises one or more additional components such as surface-active compounds, lubricating agents, wetting agents, dispersing agents, hydrophobing agents, adhesive agents, flow improvers, defoaming agents, deaerators, diluents, auxiliaries, colorants, dyes, pigments, sensitizers, stabilizers, and inhibitors.

In some embodiments, the nanostructure compositions described herein comprise by weight of the inkjet composition between about 0.01% and about 20%. In some embodiments, the nanostructures comprising poly(alkylene oxide) ligands comprise by weight of the inkjet composition between about 0.01% and about 20%, about 0.01% and about 15%, about 0.01% and about 10%, about 0.01% and about 5%, about 0.01% and about 2%, about 0.01% and about 1%, about 0.01% and about 0.1%, about 0.01% and about 0.05%, about 0.05% and about 20%, about 0.05% and about 15%, about 0.05% and about 10%, about 0.05% and about 5%, about 0.05% and about 2%, about 0.05% and about 1%, about 0.05% and about 0.1%, about 0.1% and about 20%, about 0.1% and about 15%, about 0.1% and about 10%, about 0.1% and about 5%, about 0.1% and about 2%, about 0.1% and about 1%, about 0.5% and about 20%, about 0.5% and about 15%, about 0.5% and about 10%, about 0.5% and about 5%, about 0.5% and about 2%, about 0.5% and about 1%, about 1% and about 20%, about 1% and about 15%, about 1% and about 10%, about 1% and about 5%, about 1% and about 2%, about 2% and about 20%, about 2% and about 15%, about 2% and about 10%, about 2% and about 5%, about 5% and about 20%, about 5% and about 15%, about 5% and about 10%, about 10% and about 20%, about 10% and about 15%, or about 15% and 20%.

In some embodiments, the inkjet composition comprising a nanostructure or a nanostructure composition described herein is used in the formulation of an electronic device. In some embodiments, the inkjet composition comprising a nanostructure or a nanostructure composition described herein is used in the formulation of an electronic device selected from the group consisting of a nanostructure film, a display device, a lighting device, a backlight unit, a color filter, a surface light-emitting device, an electrode, a magnetic memory device, and a battery. In some embodiments, the inkjet composition comprising a nanostructure composition described herein is used in the formulation of a light-emitting device.

Illumination Devices With Improved Properties

In some embodiments, an illumination device prepared using nanostructures of the present disclosure shows an EQE of between about 1.5% and about 20%, about 1.5% and about 15%, about 1.5% and about 12%, about 1.5% and about 10%, about 1.5% and about 8%, about 1.5% and about 4%, about 1.5% and about 3%, about 3% and about 20%, about 3% and about 15%, about 3% and about 12%, about 3% and about 10%, about 3% and about 8%, about 8% and about 20%, about 8% and about 15%, about 8% and about 12%, about 8% and about 10%, about 10% and about 20%, about 10% and about 15%, about 10% and about 12%, about 12% and about 20%, about 12% and about 15%, or about 15% and about 20%. In some embodiments, an illumination device prepared using nanostructures of the present disclosure shows an EQE of between about 1.5% and about 15%. In some embodiments, an illumination device prepared using nanostructures of the present disclosure shows an EQE of about 5%. In some embodiments, the illumination device is a light emitting diode.

In some embodiments, an illumination device prepared using the nanostructures of the present disclosure shows an improved lifetime. In some embodiments, an illumination device prepared using the nanostructures of the present disclosure reaches 50% of initial luminance of 500 cd/m$^2$ (nits) ($T_{50}$) after between about 1 second and about 100 seconds, 1 about second and about 50 seconds, about 1 second and about 40 seconds, about 1 second and about 30 seconds, about 1 second and about 20 seconds, about 1 second and about 10 seconds, about 10 seconds and about 100 seconds, about 10 seconds and about 50 seconds, about 10 seconds and about 40 seconds, about 10 seconds and about 30 seconds, about 10 seconds and about 20 seconds, about 20 seconds and about 100 seconds, about 20 seconds and about 50 seconds, about 20 seconds and about 40 seconds, about 20 seconds and about 30 seconds, about 30 seconds and about 40 seconds, about 40 seconds and about 100 seconds, about 40 seconds and about 50 seconds, or about 50 seconds and about 100 seconds. In some embodiments, an illumination device prepared using the nanostructures of the present disclosure reaches 50% of initial luminance of 500 cd/m$^2$ (nits) ($T_{50}$) after between about 19 second and about 35 seconds.

In some embodiments, the time for an illumination device prepared using the nanostructure of the present disclosure with fluoride in the shell to reach 50% of initial luminance of 500 cd/m$^2$ (nits) ($T_{50}$) is at least about three times longer than the $T_{50}$ for an electroluminescent device comprising the corresponding nanostructure without any fluoride in the shell.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

Synthesis of ZnSe$_{1-x}$Te$_x$ Alloy Nanocrystals Using TOPTe Precursor

Preparation of TOPTe precursor: the Te precursor mixture was prepared by first diluting trioctylphosphine telluride (1 M Te, 230 μL) with 2.5 mL dried and distilled oleylamine. Lithium triethylborohydride (1 M in THF, 230 μL) was added to this solution which resulted in a deeply purple solution. Finally, zinc oleate (0.5 M in trioctylphosphine (TOP), 460 µL) was added which resulted in a colorless opaque viscous gel which could be drawn into a syringe.

Oleylamine (15 mL) was added to a 100 mL three neck flask and degassed under vacuum at 110° C. for 30 minutes. Then the mixture was heated to 300° C. under nitrogen flow. Once this temperature was reached, a solution of trioctylphosphine selenide (TOPSe, 2.7 mmol) and diphenylphosphine (225 µL) in TOP (2.9 mL total) was added to the flask. Once the temperature rebounded to 300° C., the TOPTe precursor described above and a solution of diethyl zinc (295 µL) in TOP (1 mL) were quickly injected from separate syringes. The temperature was set to 280° C. and after 5 minutes the infusion of a solution of diethylzinc (294 µL) and TOPSe (4.4 mmol) in TOP (3.8 mL total) was started at a rate of 0.5 mL/min until complete addition of the full 3.8 mL. After the precursor infusion was finished, the reaction mixture was held at 280° C. for 5 minutes and then cooled to room temperature. The growth solution was diluted with an equal volume of toluene (40 mL), and the nanocrystals were precipitated by addition of ethanol (120 mL). After centrifugation the supernatant was discarded, and the nanocrystals were redispersed in hexane (5 mL). The concentration was measured as the dry weight by evaporating the solvent off an aliquot. The dried material was further subjected to thermogravimetric analysis to determine the ZnSe content.

Example 2

Synthesis of ZnSe Nanocrystals

ZnSe nanocrystals were prepared using the method of Example 1 without the injection of the TOPTe precursor.

Example 3

Synthesis of $ZnSe_{1-x}Te_x$/ZnSe Buffered Nanocrystals

A ZnSe buffer layer on $ZnSe_{1-x}Te_x$ nanocrystals of 4.0 nm average diameter with a target shell thickness of 4 monolayers (ML) ZnSe was prepared.

A 100 mL three neck flask was charged with zinc oleate (6.23 g), lauric acid (3.96 g), trioctylphosphine oxide (4.66 g), and TOP (9.4 mL). The flask was subjected to three vacuum and nitrogen backfill cycles before heating to 100° C. and degassing for 30 minutes. The reaction mixture was placed under a blanket of nitrogen and a solution of $ZnSe_{1-x}Te_x$ cores (4.0 mL, 28.0 mg/mL in hexane) mixed with TOPSe (1.8 mL of 0.3 M selenium in TOP) was added to the flask. The flask was evacuated for 2 minutes and then heated to 310° C. under nitrogen flow. Once this temperature was reached, the slow infusion of TOPSe (10.4 mL, 0.3 M in TOP) with a rate of 0.325 mL/min was started. After the selenium infusion was finished, the reaction was held at 310° C. for 10 minutes and then cooled to room temperature. The reaction mixture was diluted with toluene (45 mL). The core/shell nanocrystals were precipitated by addition of ethanol (135 mL) and then isolated by centrifugation, decantation of the supernatant, and redispersion of the nanocrystals in hexane (5 mL). This solution was filtered through a PTFE 0.22 µm syringe filter and the concentration was measured as the dry weight by evaporating the solvent off an aliquot. The dried material was further subjected to thermogravimetric analysis to determine the ZnSe content.

Example 4

Synthesis of $ZnSe_{1-x}Te_x$/ZnSe Buffered Nanocrystals with Fluoride Passivation The procedure is the same as the method outlined in Example 3, with the addition of 0.78 mmol of zinc fluoride, zirconium fluoride, or hafnium fluoride prior to the initial three vacuum and nitrogen backfill cycles.

Example 5

Synthesis of ZnSe/ZnSe Buffered Nanocrystals

A ZnSe buffer layer on a ZnSe nanocrystals of 4.0 nm average diameter with a target shell thickness of 4 monolayers (ML) ZnSe was prepared.

A 500 mL three neck flask was charged with zinc oleate (27.63 g), lauric acid (17.54 g), trioctylphosphine oxide (18.00 g), and TOP (36.0 mL). The flask was then subjected to three vacuum and nitrogen backfill cycles before heating to 100° C. and degassing for 30 minutes. The reaction mixture was placed under a blanket of nitrogen and a solution of ZnSe cores (2.0 mL, 216.0 mg/mL in hexane) was added to the flask. The flask was evacuated for 2 minutes and then heated to 310° C. under nitrogen flow. Once this temperature was reached, the slow infusion of TOPSe (25.3 mL, 0.3 M in TOP) with a rate of 0.720 mL/min was started. After the selenium infusion was finished, the reaction was held at 310° C. for 10 minutes and then cooled to room temperature. The reaction mixture was diluted with toluene (95 mL). The core/shell nanocrystals were precipitated by addition of ethanol (190 mL) and then isolated by centrifugation, decantation of the supernatant, and redispersion of the nanocrystals in hexane (7 mL). This solution was filtered through a PTFE 0.22 µm syringe filter and the concentration was measured as the dry weight by evaporating the solvent off an aliquot. The dried material was further subjected to thermogravimetric analysis to determine the ZnSe content.

Example 6

Synthesis of ZnSe/ZnSe Buffered Nanocrystals with Fluoride Passivation

The procedure is the same as the method outlined in Example 5, with the addition of 3.0 mmol of zinc fluoride, zirconium fluoride, or hafnium fluoride prior to the initial three vacuum and nitrogen backfill cycles.

Example 7

Synthesis of $ZnSe_{1-x}Te_x$/ZnSe/ZnS Core/Shell Nanocrystals

A ZnS shell on $ZnSe_{1-x}Te_x$/ZnSe nanocrystals of 6.1 nm average diameter with a target shell thickness of 4 monolayers (ML) ZnS was prepared.

A 25 mL three neck flask was charged with zinc oleate (375 mg), lauric acid (240 mg), trioctylphosphine oxide (281 mg), and TOP (0.566 mL). The flask was then subjected to three vacuum and nitrogen backfill cycles before heating to 100° C. and degassing for 30 minutes. The reaction mixture was placed under a blanket of nitrogen and a solution of ZnSe$_{1-x}$Te$_x$/ZnSe nanocrystals of Example 3 or Example 4 (0.30 mL, 216.0 mg/mL in hexane) mixed with zinc oleate/TOPS (0.064 ml of 2.0 M sulfur in TOP+0.254 ml 0.5 M zinc oleate in TOP) was added to the flask. The flask was evacuated for 2 minutes and then heated to 310° C. under nitrogen flow. Once this temperature was reached, the slow infusion of zinc oleate/TOPS (9.5 mL, 0.3 M in TOP) with a rate of 0.103 mL/min was started. After the sulfur infusion was finished, the reaction was held at 310° C. for 10 minutes and then cooled to room temperature. The reaction mixture was diluted with toluene (5 mL). The core/shell nanocrystals were precipitated by addition of ethanol (10 mL) and then isolated by centrifugation, decantation of the supernatant, and redispersion of the nanocrystals in hexane (5 mL). The precipitation was repeated once with ethanol (10 mL), and the nanocrystals were finally redispersed in octane (3 mL). This solution was filtered through a PTFE 0.22 μm syringe filter and the concentration was adjusted to 18 mg/mL after measuring the dry weight of an aliquot.

Example 8

Synthesis of ZnSe/ZnSe/ZnS Core/Shell Nanocrystals

The procedure is the same as the method outlined in Example 7, except that ZnSe/ZnSe nanocrystals of Example 5 or Example 6 were injected in place of the ZnSe$_{1-x}$Te$_x$/ZnSe nanocrystals.

Example 9

Synthesis of ZnSe/ZnSe/ZnS Core/Shell Nanocrystals with Fluoride Passivation

The procedure is the same as the method outlined in Example 8, except that the flask was also charged with anhydrous zinc fluoride (1.94 mmol), or 0.9 mmol of either hafnium or zirconium fluoride, prior to the initial three vacuum and nitrogen backfill cycles.

Example 10

Synthesis of ZnSe$_{1-x}$Te$_x$/ZnSe/ZnS Core/Shell Nanocrystals with Fluoride Passivation The procedure is the same as the method outlined in Example 7, with the addition of 3.0 mmol of zinc fluoride, zirconium fluoride, or hafnium fluoride, prior to the initial three vacuum and nitrogen backfill cycles.

Example 11

Synthesis of ZnSe/ZnSe/ZnS Core/Shell Nanocrystals with Increased Fluoride Passivation The procedure is the same as the method outlined in Example 9, except that the flask was also charged with anhydrous zinc fluoride (634.0 mg), prior to the initial three vacuum and nitrogen backfill cycles.

Example 12

Photoluminescent Properties of Nanocrystals Prepared Using Fluorides During Shelling Reaction The solution photoluminescence spectra of the ZnSe/ZnS core/shell and ZnSeTe/ZnSe/ZnS core/shell/shell quantum dots prepared in the presence of ZnF$_2$ during shelling reaction are shown in TABLE 1. As shown in TABLE 1, the resultant core/shell(s) quantum dots with a well-passivated surface exhibit high quantum yield (QY) and narrow full width at half-maximum (FWHM).

As shown in TABLE 1, increasing the material loading of ZnF$_2$ in the shelling reaction from 4 mol. eq (Sample B) to 14 mol. eq. (Sample C) resulted in better surface coverage which in turn unexpectedly resulted in a higher QY and narrower FWHM.

Figure 2:
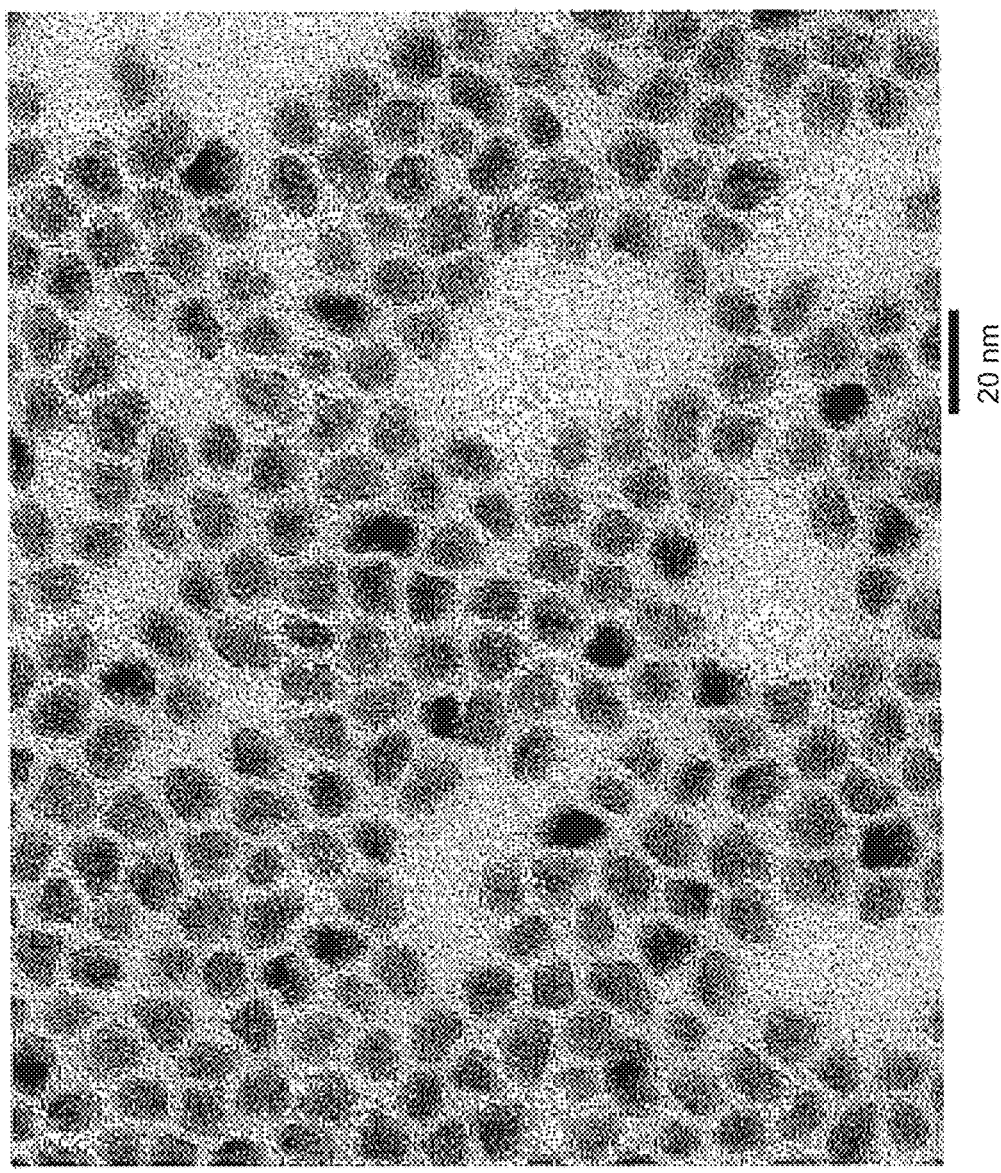
FIG. 2 is a transmission electron microscopy (TEM) image showing the typical quasi-spherical morphology that is typical of ZnSe/ZnS core/shell structured quantum dots.
Figure 3:
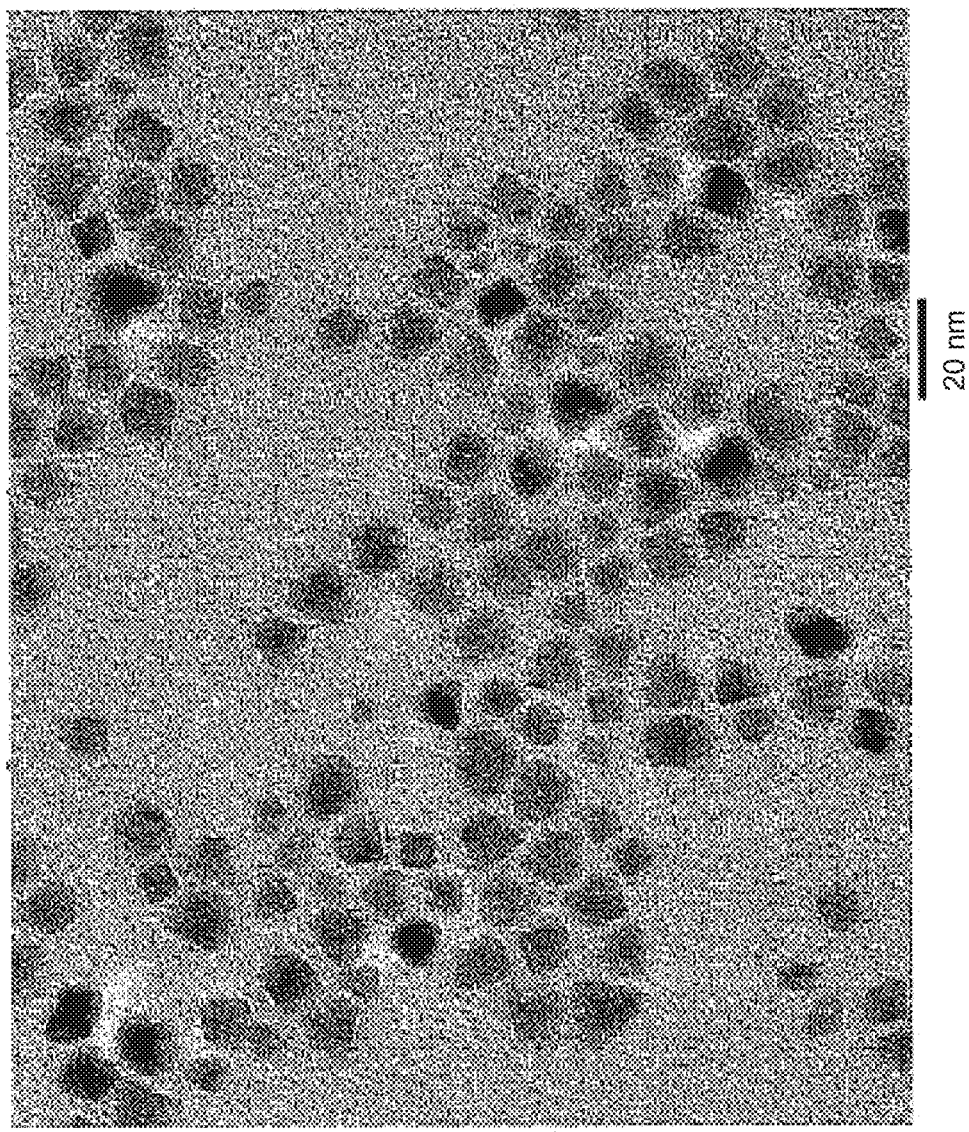
FIG. 3 is a TEM image showing an increased ratio of tetrahedral and cubic particles due to the synthesis of ZnSe/ZnS core/shell structure quantum dots treated with 4 mol. eq. $ZnF_2$.
Figure 4:
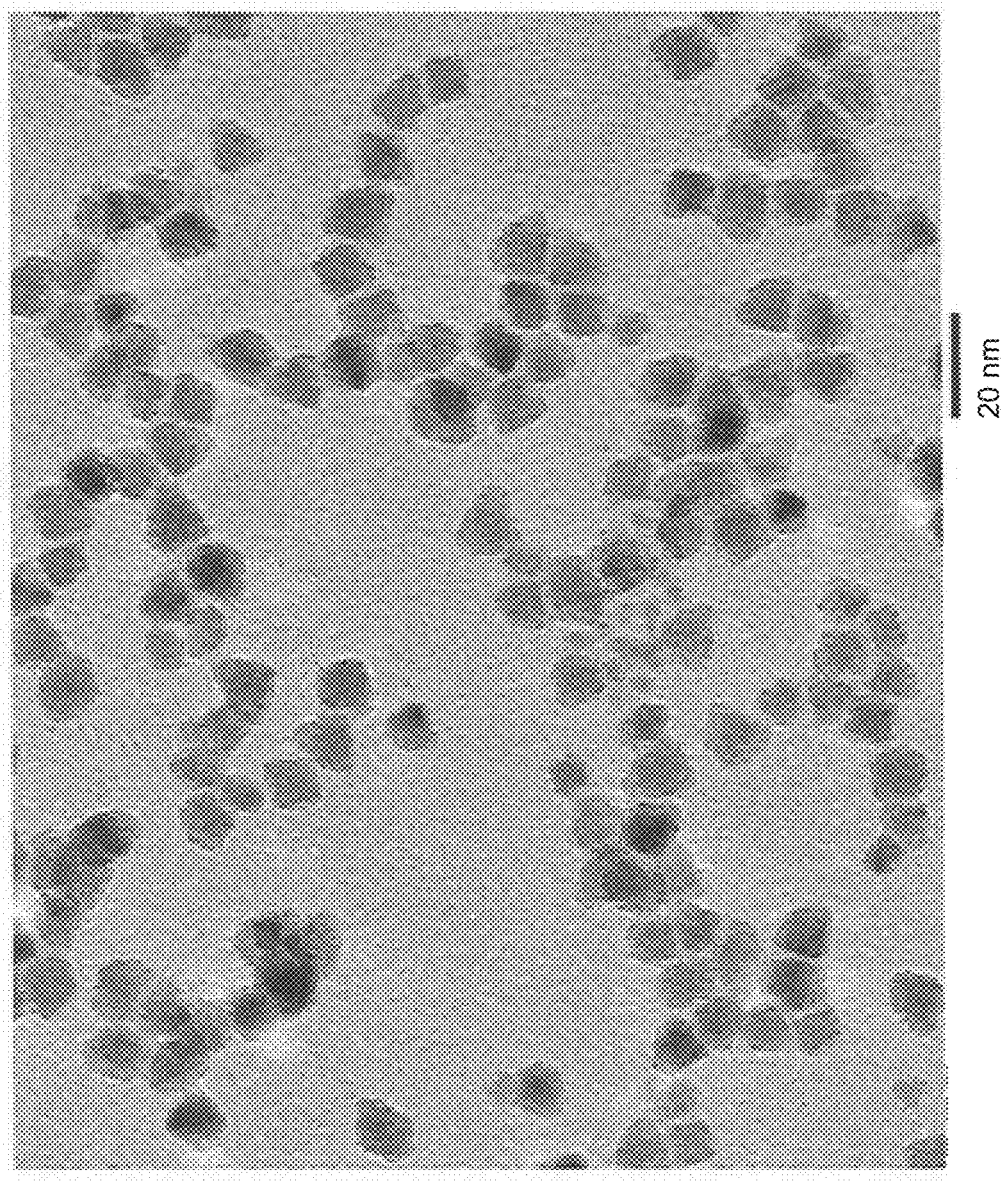
FIG. 4 is a TEM image showing an increased ratio of tetrahedral and cubic particles due to the synthesis of ZnSe/ZnS core/shell structure quantum dots with 14 mol. eq. $ZnF_2$.
Figure 5:
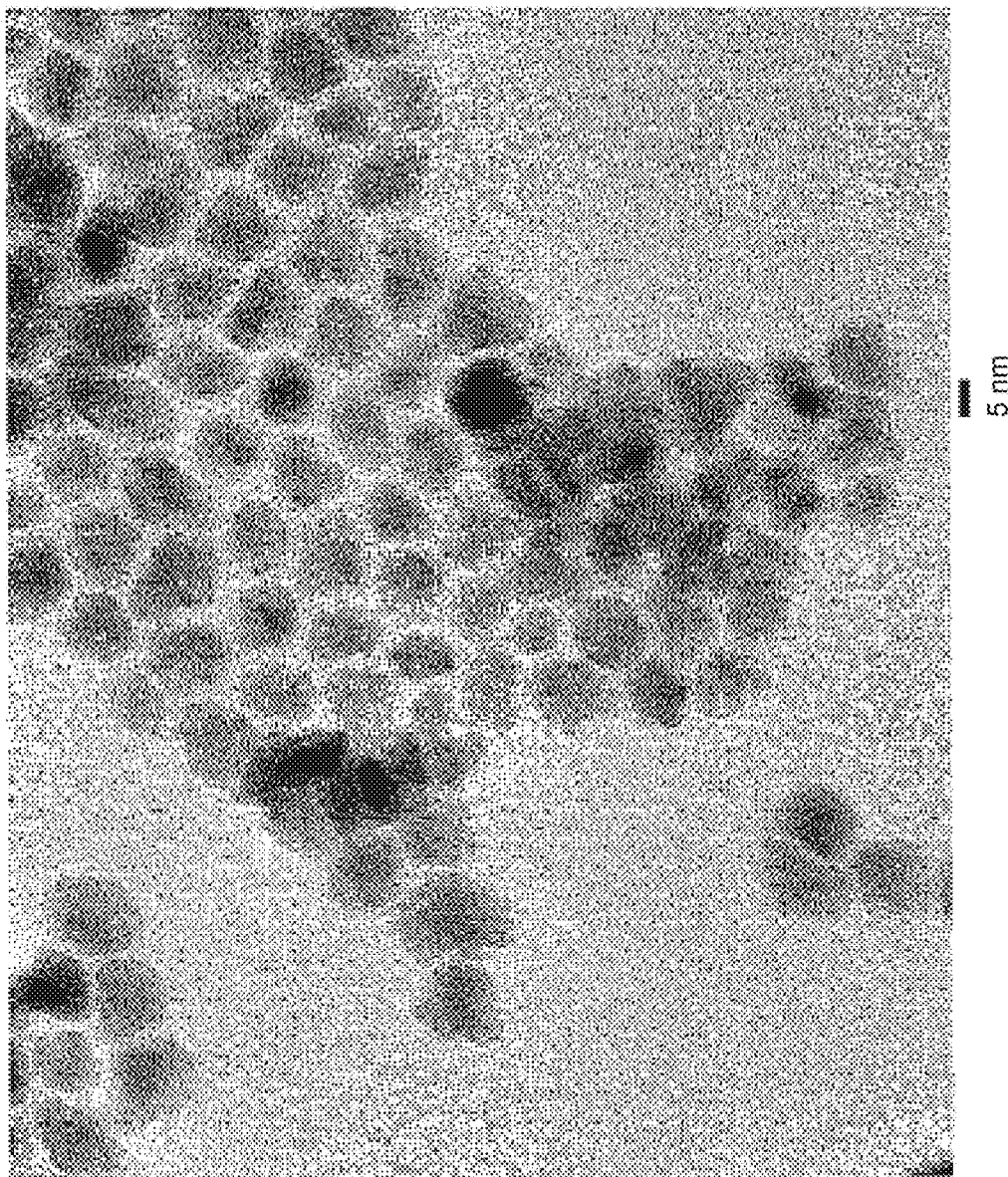
FIG. 5 is a TEM image showing the typical quasi-spherical morphology that is typical of ZnSeTe/ZnSe/ZnS core/shell/shell structured quantum dots.
Figure 6:
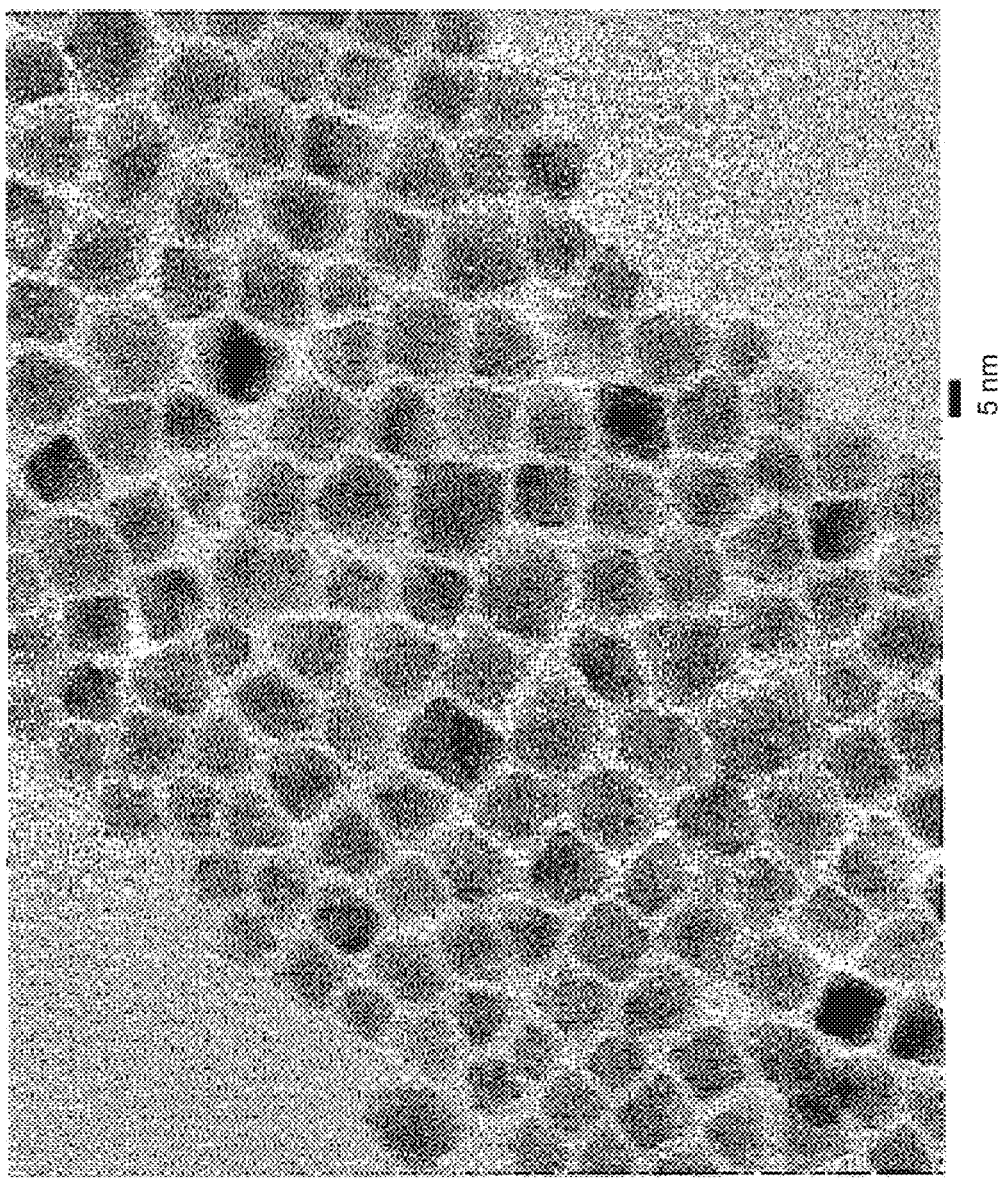
FIG. 6 is a TEM image showing an increased ratio of tetrahedral and cubic particles due to the synthesis of ZnSeTe/ZnSe/ZnS core/shell/shell structured quantum dots using $ZnF_2$.
Figure 7:
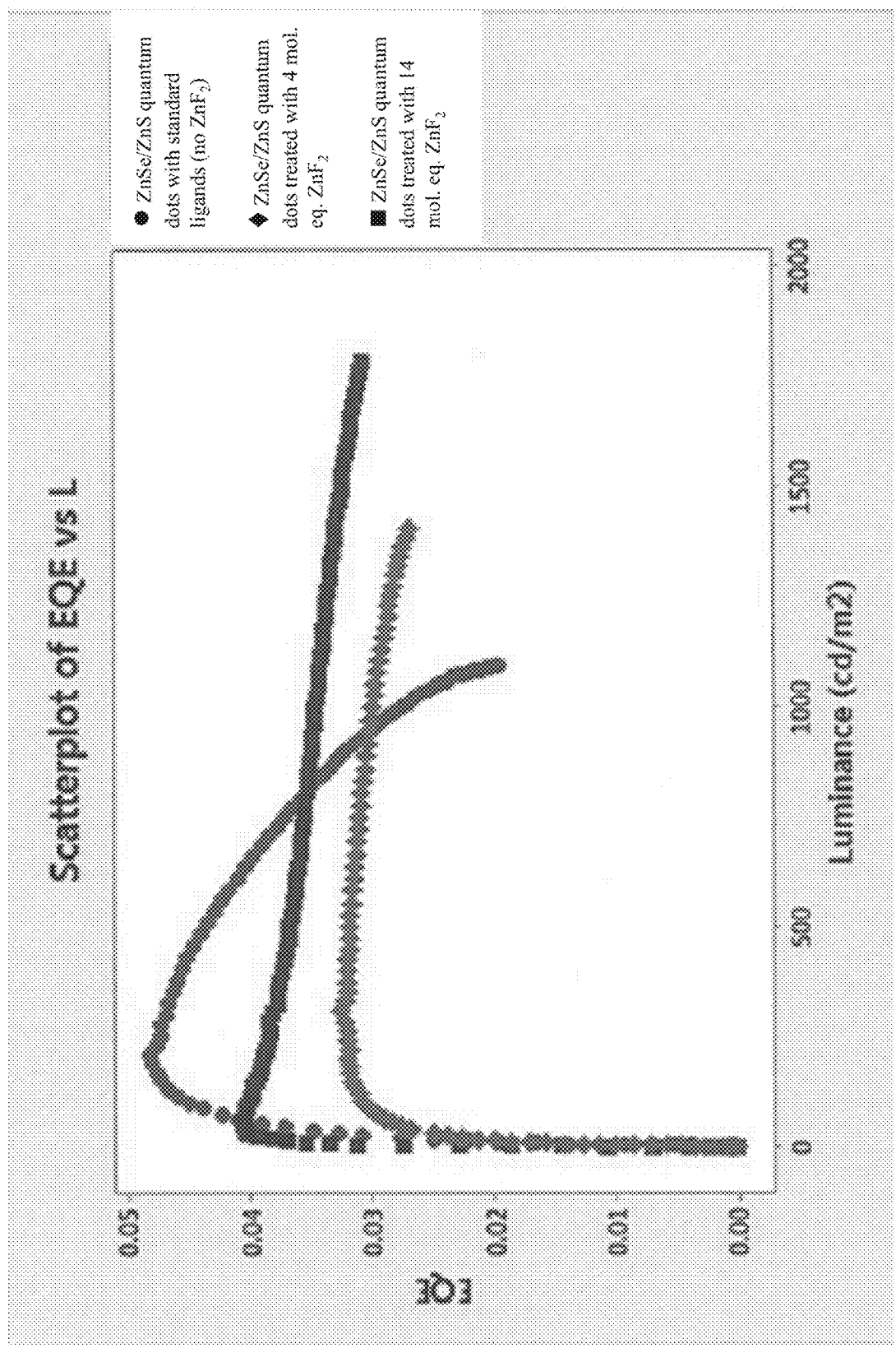
FIG. 7 is a scatterplot of external quantum efficiency (EQE) versus luminance (nits) for ZnSe/ZnS quantum dots with standard ligands (no $ZnF_2$) (●), ZnSe/ZnS quantum dots treated with 4 mol. eq. $ZnF_2$ (♦), and ZnSe/ZnS quantum dots treated with 14 mol. eq. $ZnF_2$ (■)

Incorporation of fluorides during the shell growth also resulted in a change of morphology of the ZnS shelled quantum dots. Instead of the quasi-spherical particles synthesized using standard shell growth conditions (FIG. 2 and FIG. 5), particles with cubic shape were obtained in the presence of ZnF$_2$, regardless of the loading level of ZnF$_2$ (FIG. 3, FIG. 4, and FIG. 6). These cubic particles also demonstrate significantly less roll-off at higher luminance in electroluminescent devices. For example, FIG. 7 is a scatterplot of external quantum efficiency (EQE) versus luminance (nits) for ZnSe/ZnS quantum dots with standard ligands (no ZnF$_2$) (Sample A), ZnSe/ZnS quantum dots treated with 4 mol. eq. ZnF$_2$ (Sample B), and ZnSe/ZnS quantum dots treated with 14 mol. eq. ZnF$_2$ (Sample C). The improved roll-off is indicative of the improved surface passivation and electrochemical stability of the ZnF$_2$ ligands.

Figure 8:
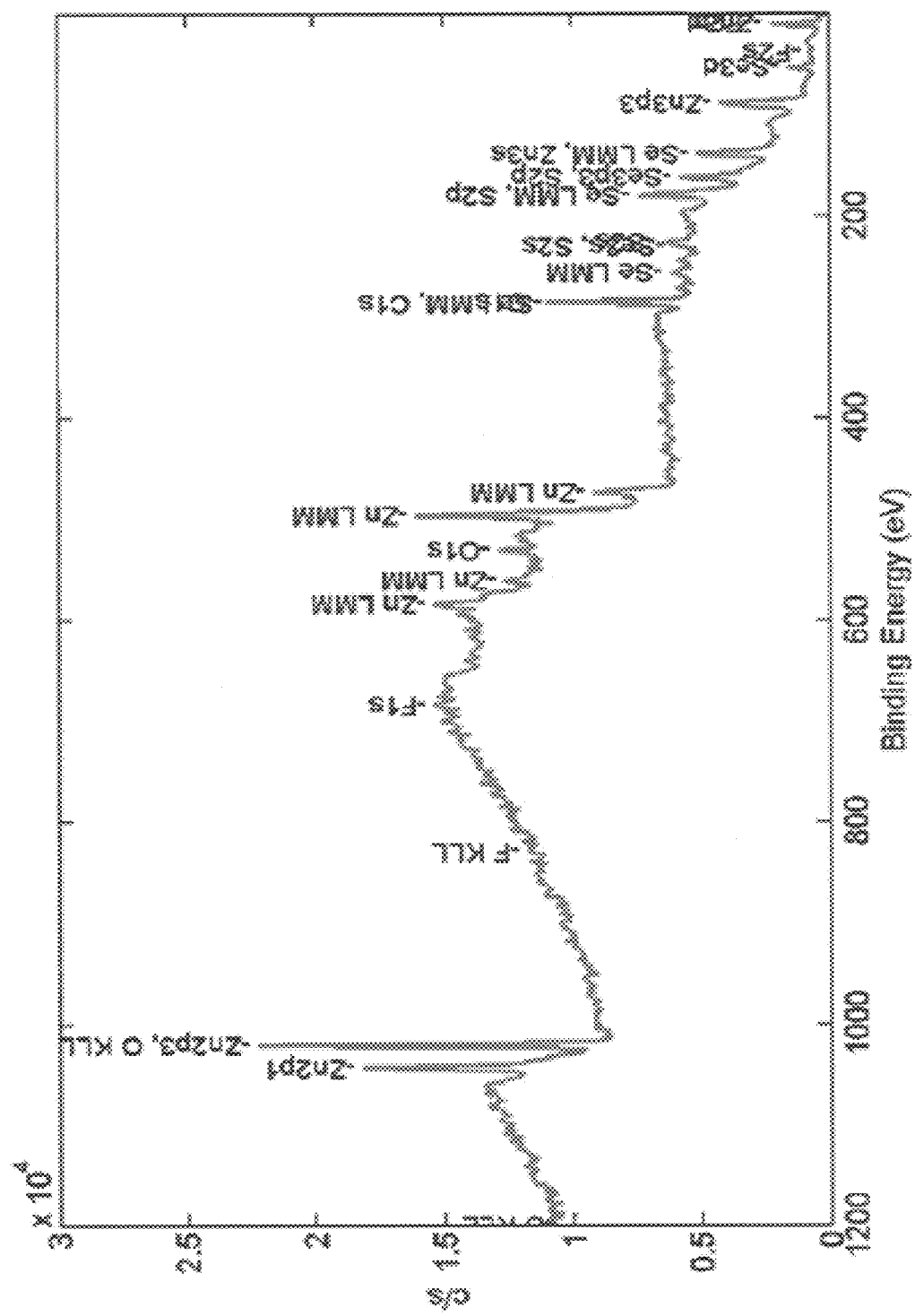
FIG. 8 is an X-ray photoelectron spectroscopy (XPS) survey spectrum of ZnSe/ZnS quantum dots treated with $ZnF_2$.
Figure 9B:
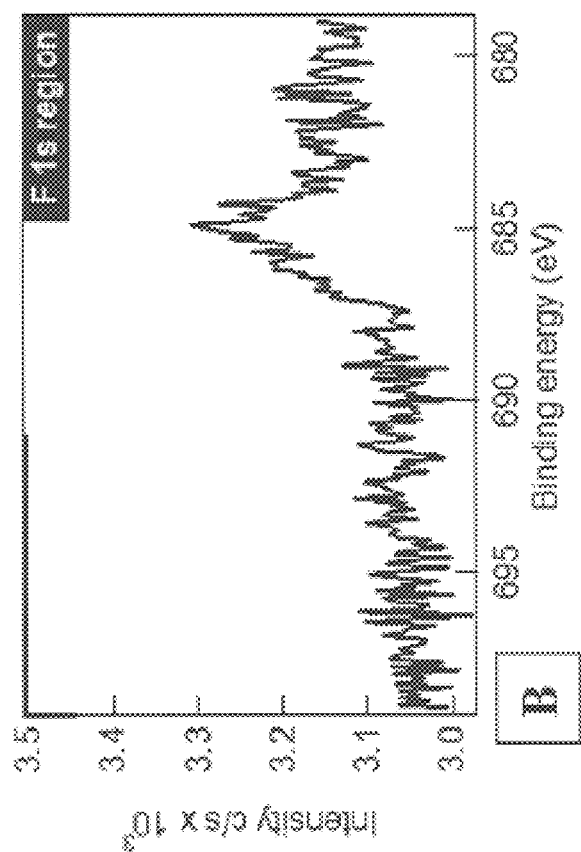
FIGS. 9A and 9B show high resolution XPS spectra of the fluorine 1s region comparing a standard ZnSe/ZnS quantum dot with no $ZnF_2$ (FIG. 9A) to a ZnSe/ZnS quantum dot treated with $ZnF_2$.
Figure 9A:
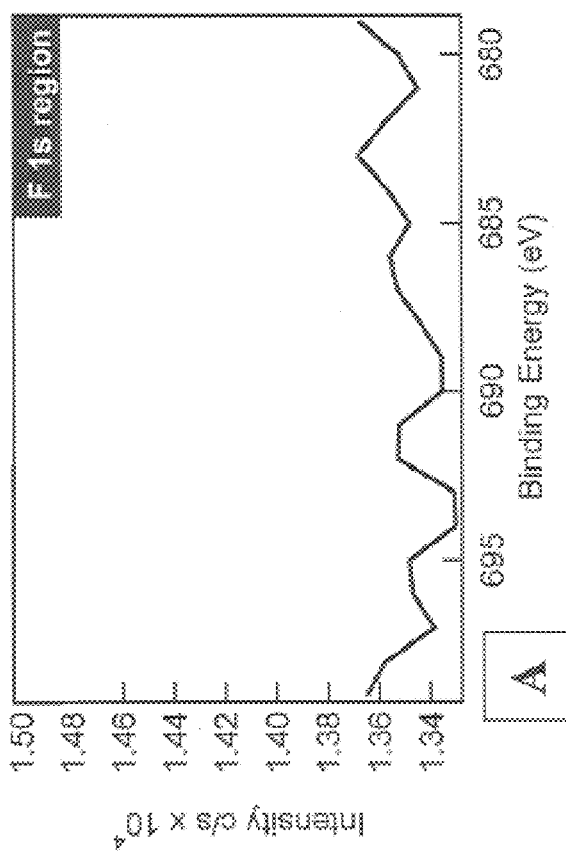

Furthermore, the presence of fluorine in the final core/shell quantum dots prepared in the presence of ZnF$_2$ during shelling reaction can be confirmed by X-ray photoelectron spectroscopy (XPS). FIG. 8 shows the overall atomic composition of Example B with 1.9% of all atoms being fluorine and with the measured F:Zn ratio being 0.13. FIGS. 9A and 9B compare the high resolution XPS spectra of the fluorine 1s region between Sample A and Sample B. A significant signal for Sample B was observed in FIG. 9B.

TABLE 1

| Sample | Composition | Method | PWL (nm) | FWHM (nm) | QY |
|---|---|---|---|---|---|
| A | ZnSe/ZnS | No fluoride | 433.1 | 14.5 | 79% |
| B | ZnSe/ZnS | ZnF$_2$ 4 eq (anhydrous) | 430 | 13.4 | 66% |
| C | ZnSe/ZnS | ZnF$_2$ 14 eq (anhydrous) | 430.2 | 12.8 | 76% |
| D | ZnSeTe/ZnSe/ZnS | No fluoride | 453.5 | 34.5 | 60% |
| E | ZnSeTe/ZnSe/ZnS | ZnF$_2$ (anhydrous) | 453.4 | 37.6 | 61% |

Example 13

Electroluminescent Devices Prepared

Devices were prepared by a combination of spin coating and thermal evaporation. Firstly, the hole injection material poly(3,4-ethylenedioxythiophene):poly(styrene sulfonate) (PEDOT:PSS) (50 nm) was spin coated onto a UV-ozone treated indium tin oxide (ITO) substrate and baked for 15 minutes at 200° C. The devices were transferred to an inert atmosphere and the hole transport material N,N'-di(naphthalen-1-yl)-N,N'-bis(4-vinylphenyl)biphenyl-4,4'-diamine (VNPB) (20 nm) was deposited by spin coating and baked at 200° C. for 15 minutes. A solution of either ZnSe/ZnS or ZnSe$_{1-x}$Te$_x$/ZnSe/ZnS QDs was deposited by spin coating (with no resin used in the emissive layer), followed by spin coating of the electron transport material ZnMgO (20 nm).

An Al cathode (150 nm) was then deposited by thermal evaporation followed by encapsulation of the device using a cap-glass, getter, and epoxy resin.

Example 14

Electroluminescent Properties of Devices Prepared Using Quantum Dots of Samples A-E The electroluminescence spectra of devices comprising ZnSe/ZnS core/shell and ZnSeTe/ZnSe/ZnS core/shell/shell quantum dots prepared in the presence of $ZnF_2$ during shelling reaction (Samples A-E in Table 1) are shown in TABLE 2. As shown in TABLE 2, the electroluminescent lifetime (T50 at 500 cd/m$^2$) was increased unexpectedly by a factor of 2-6 in quantum dots prepared in the presence of $ZnF_2$.

As shown in TABLE 2, increasing the material loading of $ZnF_2$ in the shelling reaction from 4 mol. eq (Device with Sample B) to 14 mol. eq. (Device with Sample C) resulted in better surface coverage which in turn led unexpectedly to a significantly longer lifetime.

TABLE 2

| Device | Composition | Method | PWL (nm) | $T_{50}$ at 500 cd/m$^2$ (sec) | Max EQE |
|---|---|---|---|---|---|
| Sample A | ZnSe/ZnS | No fluoride | 436 | 6.1 | 4.1% |
| Sample B | ZnSe/ZnS | $ZnF_2$ 4eq (anhydrous) | 432 | 19.6 | 3.0% |
| Sample C | ZnSe/ZnS | $ZnF_2$ 14eq (anhydrous) | 436 | 35.7 | 4.0% |
| Sample D | ZnSeTe/ZnSe/ZnS | No fluoride | 460 | 14.4 | 2.3% |
| Sample E | ZnSeTe/ZnSe/ZnS | $ZnF_2$ (anhydrous) | 456 | 40.1 | 2.3% |

Example 15

Photoluminescent Properties of Nanocrystals Prepared Using Various Fluorides During Shelling Reaction and Electroluminescent Properties of Devices Prepared Thereof The solution photoluminescence spectra of the ZnSe/ZnS core/shell and ZnSeTe/ZnSe/ZnS core/shell/shell quantum dots prepared in the presence of $ZnF_2$ during shelling reaction (Samples A-E) and in the presence of other fluoride sources are shown in TABLE 3.

TABLE 3

| Sample | Composition | Method | PWL (nm) | FWHM (nm) | QY |
|---|---|---|---|---|---|
| A | ZnSe/ZnS | No fluoride | 433.1 | 14.5 | 79% |
| B | ZnSe/ZnS | $ZnF_2$ 4eq (anhydrous) | 430 | 13.4 | 66% |
| C | ZnSe/ZnS | $ZnF_2$ 14eq (anhydrous) | 430.2 | 12.8 | 76% |
| D | ZnSeTe/ZnSe/ZnS | No fluoride | 453.5 | 34.5 | 60% |
| E | ZnSeTe/ZnSe/ZnS | $ZnF_2$ (anhydrous) | 453.4 | 37.6 | 61% |
| F | ZnSe/ZnS | $TBAPF_6$ | 403.9 | 20.3 | 11% |
| G | ZnSe/ZnS alloy | HF & $ZnCl_2$ | 425.2 | 16.5 | 89% |
| H | ZnSe/ZnS alloy | HF | 429.4 | 15.4 | 86% |
| I | ZnSe/ZnS alloy | HF & DCE | 426.4 | 18.5 | 83% |

The electroluminescence spectra of devices (Device A-I) comprising quantum dots of Samples A-I in Table 3, respectively, are shown in TABLE 4.

TABLE 4

| Device | Composition | Method | PWL (nm) | $T_{50}$ at 500 cd/m$^2$ (sec) | Max EQE |
|---|---|---|---|---|---|
| Sample A | ZnSe/ZnS | No fluoride | 436 | 6.1 | 4.1% |
| Sample B | ZnSe/ZnS | $ZnF_2$ 4eq (anhydrous) | 432 | 19.6 | 3.0% |
| Sample C | ZnSe/ZnS | $ZnF_2$ 14eq (anhydrous) | 436 | 35.7 | 4.0% |
| Sample D | ZnSeTe/ZnSe/ZnS | No fluoride | 460 | 14.4 | 2.3% |
| Sample E | ZnSeTe/ZnSe/ZnS | $ZnF_2$ (anhydrous) | 456 | 40.1 | 2.3% |
| Sample F | ZnSe/ZnS | $TBAPF_6$ | 420 | 1.7 | 0.09% |
| Sample G | ZnSe/ZnS alloy | HF & $ZnCl_2$ | 432 | 39.7 | 0.07% |
| Sample H | ZnSe/ZnS alloy | HF | 436 | 14.7 | 3.4% |
| Sample I | ZnSe/ZnS alloy | HF & DCE | 432 | 10.9 | 1.8% |

Example 16

Photoluminescent Properties of Nanocrystals Prepared Using Metal Fluorides During Core Buffer Growth/Shell Reaction and Electroluminescent Properties of Devices Prepared Thereof The solution photoluminescence spectra of the ZnSe/ZnS core/shell and ZnSeTe/ZnSe/ZnS core/shell/shell quantum dots prepared in the presence of Group IV fluorides during core buffer growth/shell reaction are shown in TABLE 5. As shown in TABLE 5, the resultant core/shell(s) quantum dots with a well-passivated surface exhibit high quantum yield (QY) and narrow full width at half-maximum (FWHM).

TABLE 5

| Sample | Composition | Method | PWL (nm) | FWHM (nm) | QY |
|---|---|---|---|---|---|
| J | ZnSe/ZnS | No fluoride | 433.1 | 14.5 | 79% |
| K | ZnSe/ZnS | $ZrF_4$ Core Only | 433.4 | 15.9 | 79% |
| L | ZnSe/ZnS | $ZrF_4$ Core & Shell | 431.3 | 16.0 | 85% |
| M | ZnSeTe/ZnSe/ZnS | No fluoride | 446.2 | 19.2 | 47% |
| N | ZnSeTe/ZnSe/ZnS | $ZrF_4$ Core Only | 447.2 | 21.3 | 53% |
| O | ZnSeTe/ZnSe/ZnS | $ZrF_4$ Core & Shell | 445.8 | 22.2 | 59% |

The electroluminescence spectra of devices comprising ZnSe/ZnS core/shell quantum dots (Samples J and K in Table 5) are shown in TABLE 6. As shown in TABLE 6, the electroluminescent lifetime ($T_{50}$ at 500 cd/m$^2$) was increased significantly in quantum dots prepared in the presence of $ZrF_4$ in the core (Device with Sample K).

TABLE 6

| Device | Composition | Method | PWL (nm) | $T_{50}$ at 500 cd/m$^2$ (sec) | Max EQE |
|---|---|---|---|---|---|
| Sample J | ZnSe/ZnS | No fluoride | 436 | 98.4 | 8.3% |
| Sample K | ZnSe/ZnS | $ZrF_4$ Core Only | 436 | 186 | 11.3% |

Example 17

Figure 10:
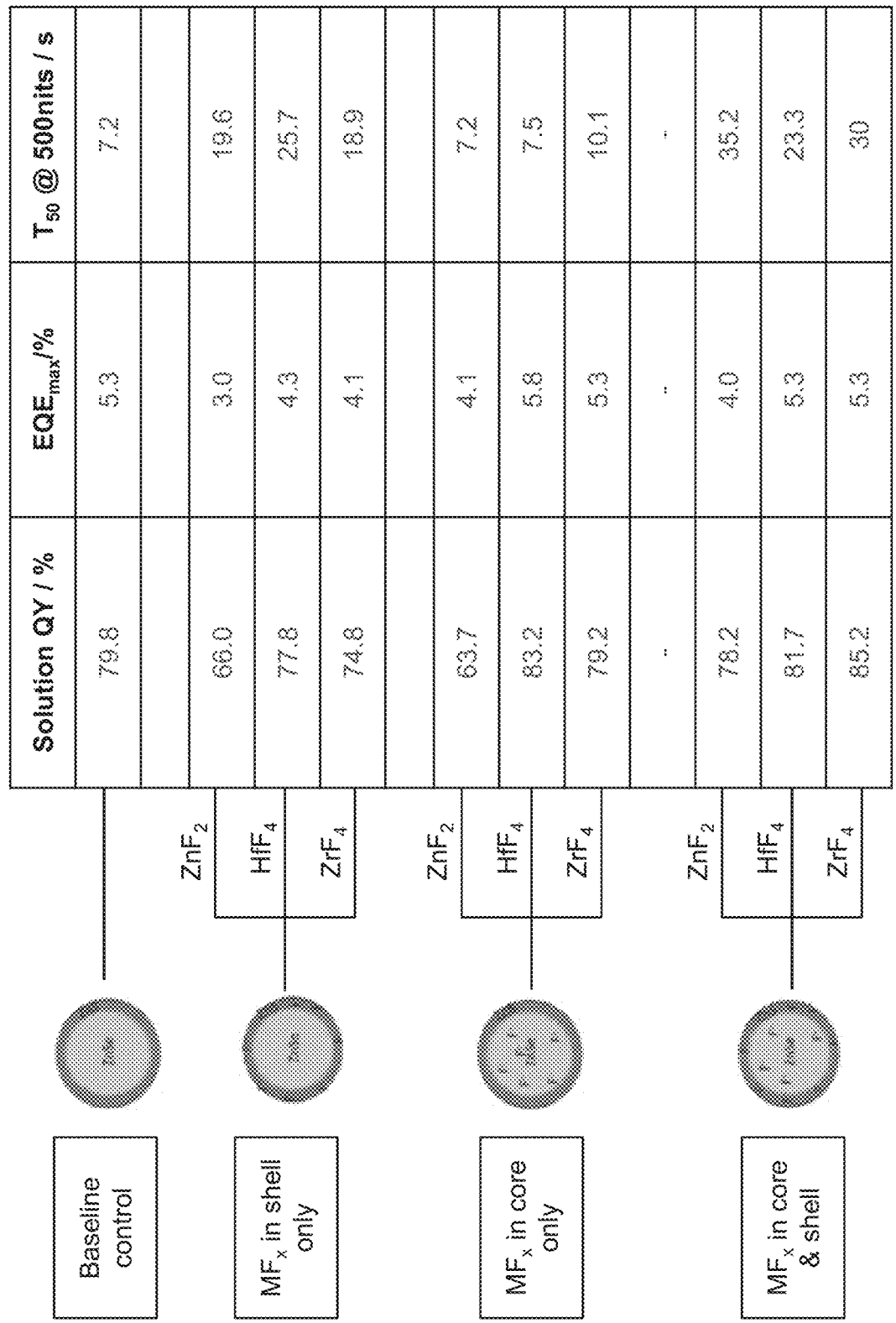
FIG. 10 is a table comparing solution quantum yield, maximum external quantum efficiency and device lifetime for a control ZnSe/ZnS quantum dot, ZnSe/ZnS quantum dots containing metal fluorides in only the shell layer, ZnSe/ZnS quantum dots containing metal fluorides in only the core layer, and ZnSe quantum dots containing metal fluorides in both the core layer and the shell layer.

Photoluminescent Properties of Nanocrystals Prepared Using Metal Fluorides During Core Buffer Growth/Shell Reaction and Electroluminescent Properties of Devices Prepared Thereof The solution quantum yield of the ZnSe/ZnS core/shell quantum dots prepared in the presence of metal fluorides during core buffer growth/shell reaction, and the electroluminescence spectra of devices comprising these quantum dots are shown in TABLE 7 (FIG. 10).

TABLE 7

| Sample | Composition | Method | QY | Max EQE | $T_{50}$ at 500 cd/m$^2$ (sec) |
|---|---|---|---|---|---|
| P | ZnSe/ZnS | No fluoride | 79.8% | 5.3% | 7.2 |
| Q | ZnSe/ZnS | ZnF$_2$ Shell Only | 66.0% | 3.0% | 19.6 |
| R | ZnSe/ZnS | HfF$_4$ Shell Only | 77.8% | 4.3% | 25.7 |
| S | ZnSe/ZnS | ZrF$_4$ Shell Only | 74.8% | 4.1% | 18.9 |
| T | ZnSe/ZnS | ZnF$_2$ Core Only | 63.7% | 4.1% | 7.2 |
| U | ZnSe/ZnS | HfF$_4$ Core Only | 83.2% | 5.8% | 7.5 |
| V | ZnSe/ZnS | ZrF$_4$ Core Only | 79.2% | 5.3% | 10.1 |
| W | ZnSe/ZnS | ZnF$_2$ Core & Shell | 78.2% | 4.0% | 35.2 |
| X | ZnSe/ZnS | HfF$_4$ Core & Shell | 81.7% | 5.3% | 23.3 |
| Y | ZnSe/ZnS | ZrF$_4$ Core & Shell | 85.2% | 5.3% | 30 |

As shown in TABLE 7, as compared to baseline control Sample P, retention of baseline EQE was observed in all ZnSe cores treated with metal fluorides (Samples T-Y). In addition, a significant and unexpected increase in device lifetime (by an order of 2-5) was observed in Samples Q-S and W-Y where metal fluorides were present in the shelling reaction. Moreover, the combination of metal fluorides in both core and shell results in superior quantum dots (Samples W-Y) with longer operating lifetime in the electroluminescent devices without compromising EQE.

Example 18

Quantum Dot Synthesis

Quantum dots used in Examples 19-25 were synthesized using procedures described in U.S. Patent Appl. Publication No. 2017/0066965 (ZnSe/ZnS quantum dots), U.S. Patent Appl. Publication No. 2017/0306227 (InP/ZnSe/ZnS quantum dots), or U.S. Provisional Appl. No. 62/677,853 (ZnSe$_{1-x}$Te$_x$/ZnSe/ZnS quantum dots), which are incorporated by reference in their entireties. The as-synthesized quantum dots were capped with zinc oleate ligands as their native ligands.

Example 19

TBAF and Octylamine Treatment of InP/ZnSe/ZnS Quantum Dots (Sample Z)

10 mg of tetrabutylammonium fluoride trihydrate (TBAF), 13 mg of didodecyldimethylammonium chloride, and 8 mg of octylamine were dissolved in 1.8 mL of toluene. Green-emitting InP/ZnSe/ZnS quantum dots (18 mg, 0.43 mL of a 42 mg/mL stock solution in octane) comprising zinc oleate native ligands were added to this solution. The mixture was stirred at 70° C. for 60 minutes. The quantum dots comprising TBAF ligands were isolated by precipitation with acetonitrile (1.2 mL) and redispersed in octane (0.5 mL). The octane dispersion was used for optical characterization.

Example 20

Octylamine Treatment of InP/ZnSe/ZnS Quantum Dots (Sample AA)

13 mL of didodecyldimethylammonium chloride and 8 mg of octylamine were dissolved in 1.8 mL of toluene. Green-emitting InP/ZnSe/ZnS quantum dots (18 mg, 0.43 mL of a 42 mg/mL stock solution in octane) comprising zinc oleate native ligands were added to this solution. The mixture was stirred at 70° C. for 60 minutes. The resulting quantum dots were isolated by precipitation with acetonitrile (1.2 mL) and redispersed in octane (0.5 mL). The octane dispersion was used for optical characterization.

Example 21

TBAF Treatment of InP/ZnSe/ZnS Quantum Dots (Sample AB)

10 mg of tetrabutylammonium fluoride trihydrate and 13 mg of didodecyldimethylammonium chloride were dissolved in 1.8 mL of toluene. Green-emitting InP/ZnSe/ZnS quantum dots (18 mg, 0.43 mL of a 42 mg/mL stock solution in octane) comprising zinc oleate native ligands were added to this solution. The mixture was stirred at 70° C. for 60 minutes. The quantum dots comprising TBAF ligands were isolated by precipitation with acetonitrile (1.2 mL) and redispersed in octane (0.5 mL). The octane dispersion was used for optical characterization.

Example 22

Excess Octylamine Treatment of InP/ZnSe/ZnS Quantum Dots (Samples AC and AD)

Excess octylamine (10 mg) was added to 0.1 mL of the final octane solutions prepared in Example 19 (using TBAF and octylamine) and Example 20 (using only octylamine). These mixtures were directly used for optical characterization.

Example 23

Photoluminescent Properties of Nanocrystals After Fluoride and/or Amine Treatment and Electroluminescent Properties of Devices Prepared Thereof The solution quantum yield, photoluminescence, and full-width at half-maximum values of InP/ZnSe/ZnS quantum dots prepared with and without fluoride treatment are shown in TABLE 8.

TABLE 8

| Sample | Composition | Method | QY (%) | PWL (nm) | FWHM (nm) |
|---|---|---|---|---|---|
| Z | InP/ZnSe/ZnS | TBAF and Octylamine | 74.6 | 534.7 | 37.2 |
| AA | InP/ZnSe/ZnS | Octylamine Only | 66.5 | 533.7 | 37.3 |
| AB | InP/ZnSe/ZnS | TBAF Only | 76.3 | 534.0 | 37.2 |
| AC | InP/ZnSe/ZnS | TBAF and Excess Octylamine | 70.2 | 535.1 | 38.4 |

TABLE 8-continued

| Sample | Composition | Method | QY (%) | PWL (nm) | FWHM (nm) |
|---|---|---|---|---|---|
| AD | InP/ZnSe/ZnS | No TBAF and Excess Octylamine | 54.2 | 536.1 | 39.4 |

Example 24

TBAF and Octylamine Treatment of InP/ZnSe/ZnS Quantum Dots (Sample AE)

19 mg of TBAF, 13 mg of didodecyldimethylammonium chloride, and 8 mg of octylamine were dissolved in 1.8 mL of toluene. Red-emitting InP/ZnSe/ZnS QDs (18 mg, 0.055 mL of a 325 mg/mL stock solution in octane) with zinc oleate native ligands were added to this solution. The mixture was stirred at 70° C. for 120 min. The exchanged QDs were isolated by precipitation with acetonitrile (0.6 mL) and redispersed in octane (0.5 mL). The octane dispersion was used for optical characterization.

Example 25

Octylamine Treatment of InP/ZnSe/ZnS Quantum Dots (Sample AF)

Didodecyldimethylammonium chloride (13 mg), and octylamine (8 mg) were dissolved in toluene (1.8 mL). Red-emitting InP/ZnSe/ZnS QDs (18 mg, 0.055 mL of a 325 mg/mL stock solution in octane) with zinc oleate native ligands were added to this solution. The mixture was stirred at 70° C. for 120 min. The exchanged QDs were isolated by precipitation with acetonitrile (0.6 mL) and redispersed in octane (0.5 mL). The octane dispersion was used for optical characterization.

Example 26

TBAF Treatment of InP/ZnSe/ZnS Quantum Dots (Sample AG)

Tetrabutylammonium fluoride trihydrate (57 mg), and didodecyldimethylammonium chloride (39 mg) were dissolved in toluene (5.4 mL). Red-emitting InP/ZnSe/ZnS QDs (54 mg, 0.165 mL of a 325 mg/mL stock solution in octane) with zinc oleate native ligands were added to this solution. The mixture was stirred at 70° C. for 120 min. The exchanged QDs were isolated by precipitation with acetonitrile (1.8 mL) and redispersed in octane (1.5 mL). The octane dispersion was used for optical characterization.

Example 27

Photoluminescent Properties of Nanocrystals After Fluoride and/or Amine Treatment and Electroluminescent Properties of Devices Prepared Thereof The solution quantum yield, photoluminescence, and full-width at half-maximum values of InP/ZnSe/ZnS quantum dots prepared with and without fluoride treatment are shown in TABLE 9.

TABLE 9

| Sample | Composition | Method | QY (%) | PWL (nm) | FWHM (nm) |
|---|---|---|---|---|---|
|  | InP/ZnSe/ZnS | Zn(OA)$_2$ Native Ligands | 87.5 | 616.4 | 43.7 |
| AE | InP/ZnSe/ZnS | TBAF and Octylamine | 86.5 | 616.4 | 42.2 |
| AF | InP/ZnSe/ZnS | Octylamine Only | 75.0 | 617.8 | 42.5 |
| AG | InP/ZnSe/ZnS | TBAF Only | 82.1 | 618.8 | 41.5 |

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A nanostructure comprising:
a nanocrystal core; and
at least one shell disposed on the core, wherein at least one shell comprises ZnS or ZnSe;
at least one fluoride bound to the surface of the nanostructure; and
at least one amine bound to the surface of the nanostructure.

2. The nanostructure of claim 1, wherein the core comprises InP.

3. The nanostructure of claim 1, wherein at least one shell comprises ZnSe.

4. The nanostructure of claim 1, wherein at least one shell comprises a first shell comprising ZnSe and a second shell comprising ZnS.

5. The nanostructure of claim 1, wherein the fluoride is in the form of a metal fluoride, ammonium fluoride, or tetraalkylammonium fluoride.

6. The nanostructure of claim 1, wherein the fluoride is in the form of a tetraalkylammonium fluoride.

7. The nanostructure of claim 1, wherein the molar ratio of fluoride bound to the nanostructure to zinc in the nanostructure is between about 0.05 and about 0.35.

8. The nanostructure of claim 1, wherein the nanostructure comprises a nanostructure comprising a core comprising InP, at least one shell comprising ZnS, at least one shell comprising ZnSe, tetraalkylammonium fluoride bound to the surface of the nanostructure, and octylamine bound to the surface of the nanostructure.

9. The nanostructure of claim 1, wherein the nanostructure exhibits a peak emission wavelength of between 450 nm and 550 nm.

10. The nanostructure of claim 1, wherein the nanostructure exhibits a peak emission wavelength of between 550 nm and 650 nm.

11. The nanostructure of claim 1, wherein the nanostructure exhibits a photoluminescence quantum yield of between about 60% and about 99%.

12. The nanostructure of claim 1, wherein the nanostructure exhibits a photoluminescence quantum yield of between about 60% and about 90%.

13. The nanostructure of claim 1, wherein the nanostructure is a quantum dot.

14. A device comprising the nanostructure of claim 1.

15. A film comprising the nanostructure of claim 1 and at least one organic resin.

16. A molded article comprising the film of claim 15.

17. A method of preparing the nanostructure of claim 1, comprising admixing:
   (a) a nanostructure comprising a nanocrystal core and at least one shell disposed on the core, wherein at least one shell comprises ZnS or ZnSe;
   (b) at least one fluoride source; and
   (c) at least one amine source;
to provide a nanostructure.

* * * * *